(12) United States Patent
Shirai et al.

(10) Patent No.: US 12,287,949 B2
(45) Date of Patent: Apr. 29, 2025

(54) INFORMATION PROCESSING SYSTEM, METHOD FOR PROCESSING INFORMATION, AND COMPUTER PROGRAM

(71) Applicant: GREE, Inc., Tokyo (JP)

(72) Inventors: Akihiko Shirai, Kanagawa (JP); Yusuke Yamazaki, Tokyo (JP)

(73) Assignee: GREE, INC., Tokyo (JP)

( * ) Notice: Subject to any disclaimer, the term of this patent is extended or adjusted under 35 U.S.C. 154(b) by 76 days.

(21) Appl. No.: 17/941,040

(22) Filed: Sep. 9, 2022

(65) Prior Publication Data

US 2023/0084288 A1  Mar. 16, 2023

(30) Foreign Application Priority Data

Sep. 10, 2021 (JP) .................................. 2021-147387

(51) Int. Cl.
*G06F 3/04817* (2022.01)
*G06F 3/16* (2006.01)
*G06T 13/40* (2011.01)
*G06T 13/80* (2011.01)

(52) U.S. Cl.
CPC ............ *G06F 3/04817* (2013.01); *G06F 3/16* (2013.01); *G06T 13/40* (2013.01); *G06T 13/80* (2013.01); *G06T 2200/24* (2013.01)

(58) Field of Classification Search
None
See application file for complete search history.

(56) References Cited

U.S. PATENT DOCUMENTS

| | | |
|---|---|---|
| 2009/0276802 A1 | 11/2009 | Amento et al. |
| 2011/0304629 A1 | 12/2011 | Winchester |
| 2013/0194280 A1 | 8/2013 | Kwon et al. |
| 2015/0334075 A1* | 11/2015 | Wang .............. H04L 51/04 715/752 |
| 2016/0125635 A1 | 5/2016 | Nam et al. |
| 2016/0275091 A1* | 9/2016 | Saqer .............. H04L 67/535 |

(Continued)

FOREIGN PATENT DOCUMENTS

| | | |
|---|---|---|
| CN | 111970530 A | 11/2020 |
| JP | 2011-123779 A | 6/2011 |

(Continued)

OTHER PUBLICATIONS

Japanese Office Action issued Nov. 7, 2023, in corresponding Japanese Patent Application No. 2022-040866, 12 pages.

(Continued)

*Primary Examiner* — Robert Bader
(74) *Attorney, Agent, or Firm* — XSENSUS LLP

(57) ABSTRACT

An information processing system comprises processing circuitry configured to generate first information for displaying a video on an information processing apparatus; transmit the first information to the information processing apparatus; receive operation information regarding a plurality of operations performed on a first icon to take an action on the video displayed on the information processing apparatus; and determine, based on the operation information, a display mode of an object corresponding to the first icon, wherein the processing circuitry generates the first information for displaying the object on the video in the display mode.

18 Claims, 14 Drawing Sheets

(56) References Cited

U.S. PATENT DOCUMENTS

| | | |
|---|---|---|
| 2016/0286275 A1 | 9/2016 | Maeda et al. |
| 2018/0098028 A1* | 4/2018 | Mu ................... H04N 21/2187 |
| 2018/0160158 A1* | 6/2018 | Liu ................. H04N 21/44218 |
| 2019/0295056 A1 | 9/2019 | Wright |
| 2020/0034033 A1 | 1/2020 | Chaudhri et al. |
| 2021/0044640 A1* | 2/2021 | He .......................... G10L 15/26 |
| 2021/0266631 A1* | 8/2021 | Geng ................... H04N 21/431 |
| 2022/0141521 A1* | 5/2022 | Lin .................... H04N 21/2187 |
| | | 725/32 |

FOREIGN PATENT DOCUMENTS

| | | |
|---|---|---|
| JP | 2012-120098 A | 6/2012 |
| JP | 2015-184689 A | 10/2015 |
| JP | 2016-200853 A | 12/2016 |
| JP | 2019-205176 A | 11/2019 |
| JP | 2021-87213 A | 6/2021 |
| WO | 2017077751 A1 | 5/2017 |
| WO | 2018/142494 A1 | 8/2018 |
| WO | 2019/216249 A1 | 11/2019 |

OTHER PUBLICATIONS

Non-Final Office Action mailed Jun. 30, 2022, for U.S. Appl. No. 17/101,417, filed Nov. 23, 2020, 11 pages.

Notice of reasons for refusal mailed on Nov. 16, 2021, received for JP Application 2021-147387, 7 pages Including English Translation.

Decision of Refusal mailed on Mar. 14, 2022, received for JP Application 2021-147387, 10 pages including English Translation.

Advisory Action mailed Jun. 3, 2022, for U.S. Appl. No. 17/101,417, filed Nov. 23, 2020, 4 pages.

U.S. Office Action issued Aug. 4, 2023 in U.S. Appl. No. 18/098,498, 24 pages.

Office Action issued on Aug. 29, 2023, in corresponding Japanese patent Application No. 2022-040866, 14 pages.

Liver School [online], Jan. 13, 2021, [searched on Aug. 2, 2021], total 4 pages. Internet <URL:https://liver-school.com/freee-gift/>.

Office Action issued on Sep. 26, 2023, in corresponding Japanese patent Application No. 2022-038580, 13 pages.

Office Action issued on Nov. 15, 2023, in corresponding U.S. Appl. No. 18/098,498, 26 pages.

US Advisory Action issued Feb. 23, 2024, in U.S. Appl. No. 18/098,498, 4pp.

Notice of Reasons for Refusal mailed Jan. 7, 2025 in corresponding Japanese patent application No. JP 2024-007088 (12 pages; with English machine translation).

Notice of Reasons for Refusal mailed Feb. 25, 2025 in corresponding Japanese patent application No. JP 2024-031757 (11 pages; with English machine translation).

* cited by examiner

INFORMATION PROCESSING SYSTEM, METHOD FOR PROCESSING INFORMATION, AND COMPUTER PROGRAM

CROSS-REFERENCE TO RELATED APPLICATION

This application claims priority to JP 2021-147387, filed in Japan on Sep. 10, 2021, the contents of which is incorporated by reference in its entirety.

TECHNICAL FIELD

The present disclosure relates to an information processing system, a method for processing information, and a computer program.

BACKGROUND

Conventionally, an information processing system may generate an animation of a character object on a basis of movement of an actor. The information processing system may also stream a movie including the animation of the character object.

SUMMARY

In an exemplary implementation of the present disclosure, an information processing system comprises processing circuitry configured to generate first information for displaying a video on an information processing apparatus; transmit the first information to the information processing apparatus; receive operation information regarding a plurality of operations performed on a first icon to take an action on the video displayed on the information processing apparatus; and determine, based on the operation information, a display mode of an object corresponding to the first icon, wherein the processing circuitry generates the first information for displaying the object on the video in the display mode.

DETAILED DESCRIPTION OF THE DRAWINGS

Figure 1:
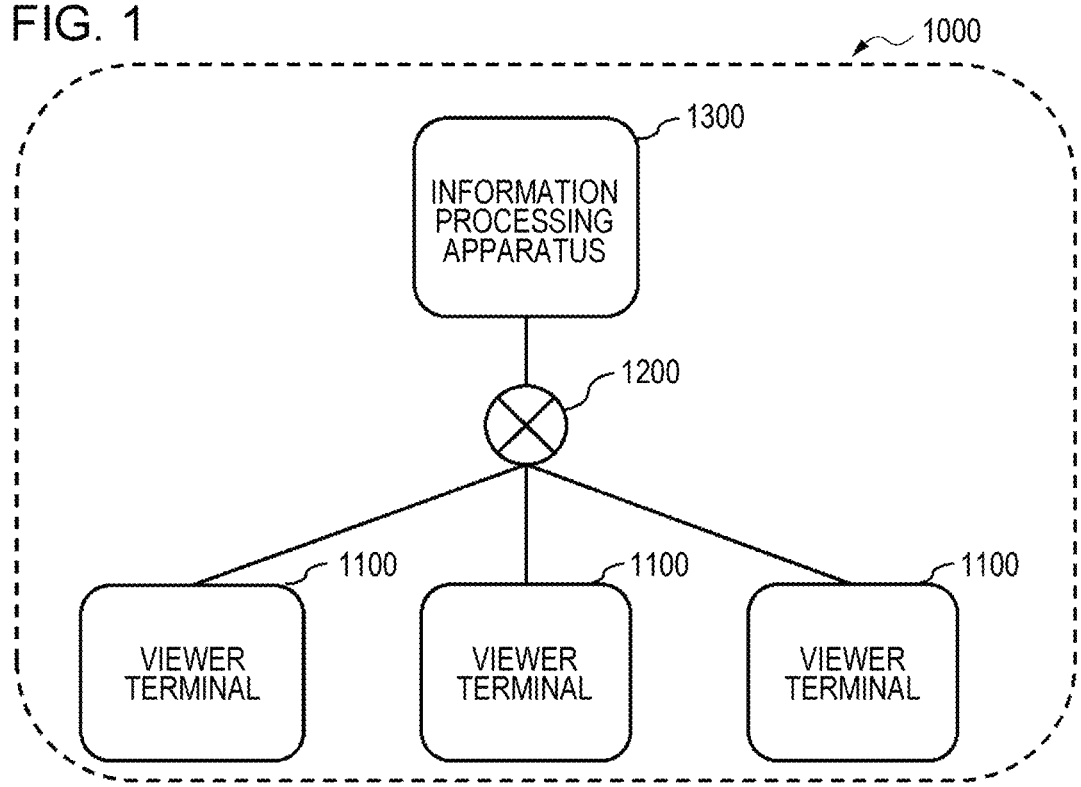
FIG. 1 is a system configuration diagram illustrating an example of an information processing system in accordance with the present disclosure.

The inventors of the present disclosure have recognized that it is an important task to improve a streamer's willingness to stream and viewers' willingness to view. For example, a streamer's willingness to stream improves as the number of gifts (the number of times of gifting) sent from viewers increases.

The inventors have recognized that an improvement in a streamer's willingness to stream leads to improvement in viewers' willingness to view. An increase in the number of times of gifting, therefore, contributes to improvement in the streamer's willingness to stream and/or the viewers' willingness to view. The inventors have further recognized that, as the number of times of gifting increases, a communication cost undesirably increases. In addition, as the number of objects displayed on a movie increases, problems such as a crowded screen and an increase in a rendering load might arise.

Accordingly, the inventors have developed technology described in the present disclosure that improves solving or mitigating problems such as an increase in a communication cost, a crowded screen, and an increase in a rendering load and improving a streamer's willingness to stream and/or viewers' willingness to view.

An information processing system in the present disclosure is an information processing system including one or more first information processing apparatuses and a server apparatus. The information processing system includes one or a plurality of computer processors, which include a generation unit that generates first information for displaying a movie on the one or more first information processing apparatuses, a transmission unit that transmits the first information generated by the generation unit to the one or more first information processing apparatuses, a reception unit that receives certain operation information regarding a plurality of certain operations performed on a first icon to take an action on the movie displayed on one of the one or more first information processing apparatuses, and a determination unit that determines, on a basis of at least the certain operation information received by the reception unit, a display mode of an object corresponding to the first icon. The generation unit generates first information for displaying the object on the movie in the display mode determined by the determination unit. The determination unit may determine the display mode by setting an amount of change from a reference value of at least one of parameters set for the object, namely display size, transparency, moving speed, and motion, on the basis of the certain operation information. The determination unit may determine the display mode of the object on a basis of a certain parameter as well as the certain operation information.

The certain parameter may be a parameter relating to at least a number of concurrent users of the movie, a sales condition of the movie, or a progress state of the movie. The certain parameter may be a parameter relating to a value of the first icon or an average operation interval of the plurality of certain operations performed on the first icon.

The one or plurality of computer processors may further include a decision unit that decides, for the plurality of certain operations, whether a next certain operation has been performed within a certain period of time from a certain operation, a measurement unit that measures a number of certain operations if the decision unit decides that a next certain operation has been performed within the certain period of time from a certain operation and ends the measurement of the number of certain operations if the decision unit decides that a next certain operation has not been performed within the certain period of time from a certain operation, a confirmation unit that confirms the number of certain operations in a case where the measurement performed by the measurement unit ends, and an operation information transmission unit that transmits the number confirmed by the confirmation unit as the certain operation information.

The one or plurality of computer processors may further include a changing unit that, if the decision unit decides that a next certain operation has been performed within the certain period of time from a certain operation, changes the display mode of the first icon. The one or plurality of computer processors may further include a playback unit that, if the decision unit decides that a next certain operation has been performed within the certain period of time from a certain operation, plays back a sound effect based on the number of certain operations. The operation information transmission unit may transmit the number as the certain operation information in a case where the confirmation unit confirms the number. The operation information transmission unit may transmit the number as the certain operation information in accordance with an instruction from the one of the one or more first information processing apparatuses after the confirmation unit confirms the number. The one or plurality of computer processors may further include a display unit that displays, on the one of the one or more first information processing apparatuses, a second icon for receiving the instruction. The one or plurality of computer processors may further include a history storage unit that stores history information regarding the number confirmed by the confirmation unit. The display unit may display, on the one of the one or more first information processing apparatuses, a third icon generated on a basis of the history information stored in the history storage unit. If a certain operation is performed on the third icon, the operation information transmission unit may transmit the certain operation information while assuming that a plurality of certain operations have been performed on the first icon.

If the number of certain operations measured by the measurement unit reaches a certain value, the operation information transmission unit may transmit the certain value as intermediate operation information before the confirmation unit confirms the number.

The decision unit may also decide whether a cancelation operation has been performed within a certain period of time from the certain operation. The one or plurality of computer processors may further include a cancelation unit that if the decision unit decides, after the number of certain operations measured by the measurement unit reaches the certain value, that the cancelation operation has been performed, determines a certain operation performed after the certain value is reached as a target of cancelation and if the decision unit decides, before the number of certain operation measured by the measurement unit reaches the certain value, that the cancelation operation has been performed, determines all the plurality of certain operations as targets of cancelation. The reception unit may receive the intermediate operation information. The generation unit may generate, on a basis of at least the intermediate operation information received by the reception unit, second information for displaying a first icon displayed on another of the one or more first information processing apparatuses in a different display mode. The transmission unit may transmit the second information to the other of the one or more first information processing apparatus.

The one or plurality of computer processors may further include an inquiry unit that, if the decision unit decides that a next certain operation has not been performed within the certain period of time from a certain operation, displays an inquiry screen on the one of the one or more first information processing apparatuses and inquires about a will to continue before the measurement unit ends the measurement of the number of certain operations. If the inquiry unit confirms the will to continue, the measurement unit continues to measure the number of certain operations, and if the inquiry unit does not confirm the will to continue, the measurement unit may end the measurement of the number of certain operations.

A method for processing information in accordance with the present disclosure is a method for processing information performed by an information processing system including one or more first information processing apparatuses and a server apparatus. The method includes the steps, which are performed by one or a plurality of computer processors included in the information processing system, of generating first information for displaying a movie on the one or more first information processing apparatuses, transmitting the first information generated in the step of generating to the one or more first information processing apparatuses, receiving certain operation information regarding a plurality of certain operations performed on a first icon to take an action on the movie displayed on one of the one or more first information processing apparatuses, and determining, on a basis of at least the certain operation information received in the step of receiving, a display mode of an object corresponding to the first icon. In the step of generating, first information for displaying the object on the movie in the display mode determined in the step of determining is generated.

Another method for processing information in accordance with the present disclosure is a method for processing information performed by an information processing apparatus connected to a server apparatus over a network. The method includes the steps, which are performed by one or a plurality of computer processors included in the information processing apparatus, of receiving first information for displaying a movie, displaying, on a basis of the first information received in the step of receiving, the movie and a first icon for taking an action on the movie, receiving a certain operation performed on the first icon, deciding whether a next certain operation has been performed within a certain period of time from a certain operation, measuring, if it is decided in the step of deciding that a next certain operation has been performed within the certain period of time from a certain operation, a number of certain operations, and if it is decided in the step of deciding that a next certain operation has not been performed within the certain period of time from a certain operation, ending the measurement of the number of certain operations, confirming, if the measurement ends in the step of measuring, the number of certain operations, and transmitting the number confirmed in the step of confirming to the server apparatus as certain operation information.

A non-transitory computer readable medium in accordance with the present disclosure may store computer executable instructions which cause one or a plurality of computer processors included in an information processing apparatus to execute the functions of receiving first information for displaying a movie, displaying, on a basis of the first information received by the function of receiving, the movie and a first icon for taking an action on the movie, receiving a certain operation performed on the first icon, deciding whether a next certain operation has been performed within a certain period of time from a certain operation, measuring, if it is decided by the function of deciding that a next certain operation has been performed within the certain period of time from a certain operation, a number of certain operations, and if it is decided by the function of deciding that a next certain operation has not been performed within the certain period of time from a certain operation, ending the measurement of the number of certain operations, confirming, if the measurement is ended by the function of measuring, the number of certain operations, and transmitting the number confirmed by the function of confirming to the server apparatus as certain operation information.

First, an outline of an information processing system according to an embodiment of the present disclosure will be described with reference to the drawings.

The information processing system in the present disclosure includes one or more first information processing apparatuses and a server apparatus, as well as one or a plurality of computer processors.

A video (also referred to as a movie throughout this disclosure) displayed on various apparatuses on the basis of first information generated by a generation unit, which will be described later, will be described as including an animation of a character object generated on the basis of movement of a streamer, but is not limited to this. The video need not necessarily include a character object generated on the basis of movement of a streamer.

For example, the video may be one in which a streamer appears or an image of a real space where a streamer does not appear. Alternatively, the video may include only a streamer's voice and a certain video, such as a karaoke video or a gaming video.

Alternatively, the video may be one in which a character object or an actual image of a streamer is superimposed upon a video game screen and/or an image of a real space. When an image of a real space includes a streamer, a character object generated on the basis of movement of the streamer may be superimposed upon an actual image of the streamer (augmented reality (AR)). Alternatively, an animation of a gift object or the like may be superimposed upon an image of a real space.

System Configuration

As illustrated in FIG. 1 as an example, an information processing system 1000 in the present disclosure may include one or more viewer terminals 1100 and an information processing apparatus (support computer) 1300, which is provided in a place such as a video streaming studio and connected to the viewer terminals 1100 over a network 1200.

The information processing apparatus 1300 may be connected to a server apparatus through the Internet, and the server apparatus may perform part or the entirety of processing to be performed by the information processing apparatus 1300. The server apparatus may be an information processing apparatus 2400 illustrated in FIG. 2.

Streaming achieved by the information processing system 1000 will be referred to as "studio streaming" herein.

In the studio streaming, movement of a streamer's (actor's) whole body is reflected by a character in real time using a known motion capture technique by capturing markers attached to the streamer with a camera provided in a studio.

Figure 2:
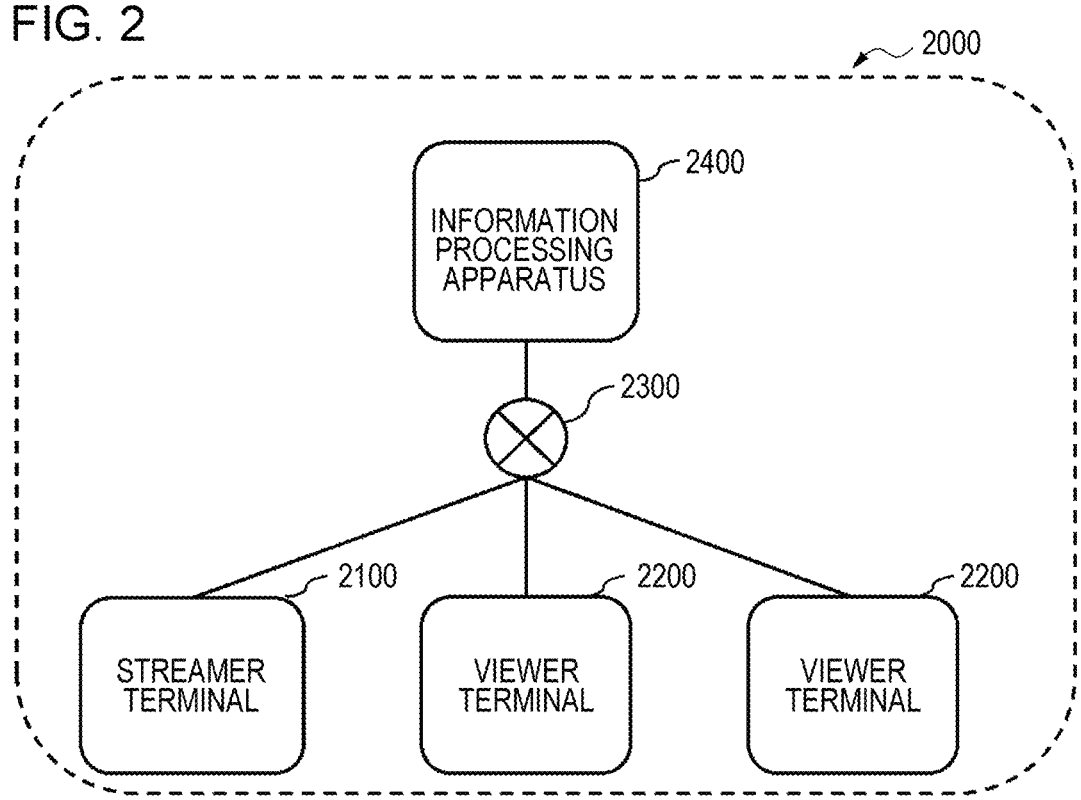
FIG. 2 is a system configuration diagram illustrating another example of the information processing system.

The information processing system 1000 in the present disclosure may operate together with another information processing system 2000 illustrated in FIG. 2 as an example. The information processing system 2000 illustrated in FIG. 2 may include a streamer terminal 2100, one or more viewer terminals 2200, and the information processing apparatus (server apparatus) 2400 connected to the streamer terminal 2100 and the viewer terminals 2200 over a network 2300.

In the above example, the streamer terminal 2100 may be an information processing terminal such as a smartphone. Streaming achieved by the information processing system 2000 will be referred to as "mobile streaming" herein.

In the mobile streaming, movement of a streamer's face is reflected by a character's face in real time using a known face tracking technique by capturing the streamer's face with a camera provided for the streamer terminal 2100.

Streamers and viewers are not particularly distinguished from each other in the mobile streaming. A viewer can start mobile streaming at any time, and a streamer can be a viewer when he/she is viewing a video streamed by another streamer.

Videos generated by the information processing system 1000 and the information processing system 2000 can be streamed to viewers, for example, from a video streaming platform.

In any type of streaming, the streamer terminal, the viewer terminals, the information processing apparatus, and other apparatuses may operate together to achieve a process for causing a character to reflect motions and generating an animation, a process for displaying a gift, which will be described later, and the like.

More specifically, the streamer terminal transmits face motion data and audio data regarding the streamer to terminals or apparatuses that generate an animation of a character object. Body motion data may also be transmitted along with the face motion data.

Although the process for generating an animation will be described as being performed by each of the streamer terminal and the viewer terminals in the present disclosure, the process need not necessarily be performed in this manner.

Figure 3:
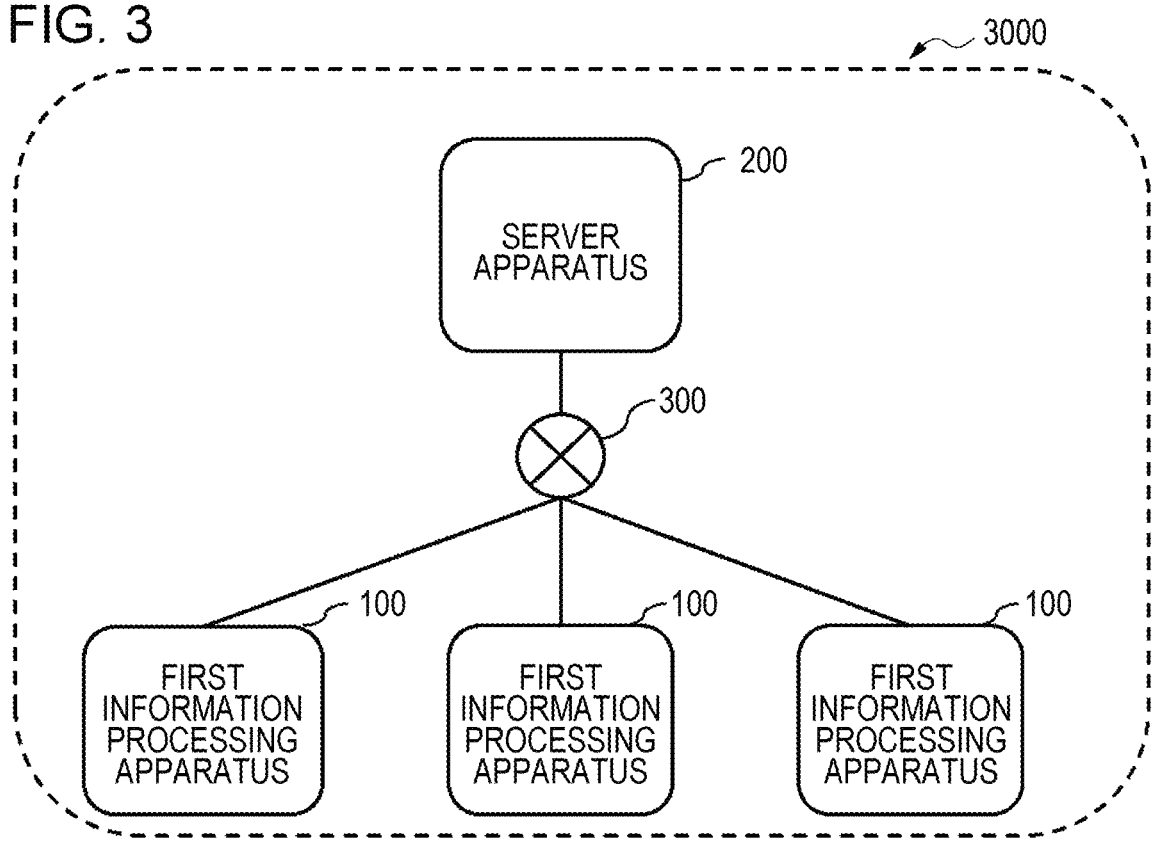
FIG. 3 is a system configuration diagram illustrating another example of the information processing system.

The information processing system in the present disclosure is not limited to the examples illustrated in FIGS. 1 and 2 and, as illustrated in FIG. 3, will be described hereinafter as an information processing system 3000 at least including first information processing apparatuses 100 as one or more viewer terminals and a server apparatus 200 connectable to the first information processing apparatuses 100 over a network 300.

In the present disclosure, each of the first information processing apparatuses 100 may be a smartphone (multi-function telephone terminal), a tablet terminal, a personal computer, a video game console, a head-mounted display (HMD), a wearable computer such as a glasses-type wearable terminal (AR glasses etc.), or another information processing apparatus capable of streaming videos. These terminals may each be a standalone apparatus that operates independently or a combination of apparatuses connected to one another in such a way as to communicate various pieces of data with one another.

Hardware Configuration

Now, the hardware configuration of the first information processing apparatuses 100 included in the information processing system 3000 will be described with reference to FIG. 4. The first information processing apparatuses 100 each include a processor 101, a memory 102, a storage 103, an input/output interface 104, and a communication interface 105. These components are connected to one another through a bus B.

Each the first information processing apparatuses 100 can achieve functions and methods described in the present embodiment through cooperation between the processor 101, the memory 102, the storage 103, the input/output interface 104, and the communication interface 105.

The processor 101 executes a function and/or a method to be achieved using codes or commands included in a program stored in the storage 103. The processor 101 may be, for example, a central processing unit (CPU), a micro-processing unit (MPU), a graphics processing unit (GPU), a microprocessor, a processor core, a multiprocessor, an application-specific integrated circuit (ASIC), a field-programmable gate array (FPGA), or the like and achieve various types of processing disclosed in each of embodiments using a logic circuit (hardware) or a dedicated circuit formed in an integrated circuit (IC) (an IC chip or a large-scale integration (LSI) chip) or the like. These circuits may be achieved by one or a plurality of integrated circuits, or a plurality of types of processing described in each embodiment may be achieved by one integrated circuit. "LSI" can be replaced by "VLSI", "super-LSI", "ultra-LSI", or the like depending on a degree of integration.

Additionally, processor may also be encompassed by or is a component of control circuitry and/or processing circuitry. Processors are considered processing circuitry or circuitry as they include transistors and other circuitry therein. The processor may be a programmed processor which executes a program stored in a memory. In this disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The memory 102 temporarily stores a program loaded from the storage 103 and provides a working area for the processor 101. The memory 102 also temporarily stores various pieces of data generated while the processor 101 is executing a program. The memory 102 may be, for example, a random-access memory (RAM), a read-only memory (ROM), or the like.

The storage 103 stores programs. The storage 103 may be, for example, a hard disk drive (HDD), a solid-state drive (SSD), a flash memory, or the like.

The communication interface 105 is achieved as hardware such as a network adapter, communication software, or a combination of these and communicates various pieces of data over the network 300. The communication may be wired communication or wireless communication, and any communication protocol may be used insofar as bidirectional communication can be performed. The communication interface 105 communicates with other information processing apparatuses over the network 300. The communication interface 105 transmits various pieces of data to other information processing apparatuses in accordance with instructions from the processor 101. The communication interface 105 also receives various pieces of data from other information processing apparatuses and transfers the various pieces of data to the processor 101.

The input/output interface 104 includes an input device that receives various operations performed on the first information processing apparatus 100 and an output device that outputs results of processing performed by the first information processing apparatus 100. In the input/output interface 104, the input device and the output device may be integrated with each other or separated from each other.

The input device can be achieved by one or a combination of apparatuses of all types capable of receiving an input from a viewer and transferring information regarding the input to the processor 101. The input device may be, for example, a touch panel, a touch display, hardware keys such as a keyboard, a pointing device such as a mouse, a camera (operation inputs through images), or a microphone (operation inputs through voices).

The input device may include a sensor unit. The sensor unit is one or more sensors that detect facial motions indicating changes in the viewer's facial expression and body motions indicating changes in a position of the viewer's body relative to the sensor unit. The facial motions include blinking and opening and closing of the mouth. A known sensor unit may be used. An example of the sensor unit includes a time-of-flight (ToF) sensor that measures and detects time-of-flight, which is time taken by light radiated onto a viewer to return after being reflected by the viewer's face or the like, a camera that captures an image of the viewer's face, and an image processing unit that performs image processing on data obtained by the camera. The sensor unit may also include an RGB camera that senses visible light and a near-infrared camera that senses near-infrared radiation. As the RGB camera or the near-infrared camera, for example, a TrueDepth (registered trademark) camera of "iPhone X (registered trademark)", "LiDAR" of "iPad Pro (registered trademark)", or a ToF sensor mounted on another smartphone may be used. More specifically, the near-infrared camera projects tens of thousands of invisible dots on the viewer's face or the like using a dot projector. The near-infrared camera then captures accurate face data by detecting and analyzing reflected light of a dot pattern, generating a depth map of the viewer's face or the like, and capturing an infrared image of the viewer's face or the like. An arithmetic processing unit of the sensor unit generates various types of information on the basis of the depth map and the infrared image, compares the various types of information with registered reference data, and calculates depth of each of points (a distance between the point and the near-infrared camera) on the viewer's face and differences in measurements other than the depth.

The sensor unit may also have a function of tracking not only the viewer's face but also the viewer's hands (hand tracking). The sensor unit may also include other sensors such as an acceleration sensor and a gyro sensor. The sensor unit may also have a spatial mapping function, which is used to recognize, on the basis of results of detection performed by the ToF sensor or another known sensor, objects in a real space in which the viewer exists and mapping the recognized objects in a spatial map. Detection data regarding facial motions and detection data regarding body motions will be simply referred to as "tracking data" hereinafter when not particularly distinguished from each other. The image processing unit of the sensor unit may be included in a control unit that can be provided for the information processing system in the present disclosure.

An operation unit as the input device may be one suitable for a type of viewer terminal. Examples of the operation unit include a touch panel integrated with a display, operation buttons provided for a case of a viewer terminal, a keyboard, a mouse, and a controller operated by the viewer by hand. The controller may include various known sensors therein, such as an inertial measurement unit (IMU) including acceleration sensors and gyroscopes. Another example of the operation unit may be a tracking apparatus that detects movement of the viewer's hands, eyes, and head, a direction of the viewer's gaze, and the like. In this mode, an instruction from the viewer can be identified on the basis of the viewer's hands, for example, and streaming of a video can be started or ended, a message or a video can be evaluated, display of a certain object (e.g., a gift, which will be described later) can be requested, or one of various other operations can be performed. When the sensor units have an input interface function such as a hand tracking function, the operation unit may be omitted.

The output device outputs results of processing performed by the processor 101. The output device may be, for example, a touch panel, a speaker, or the like.

Figure 4:
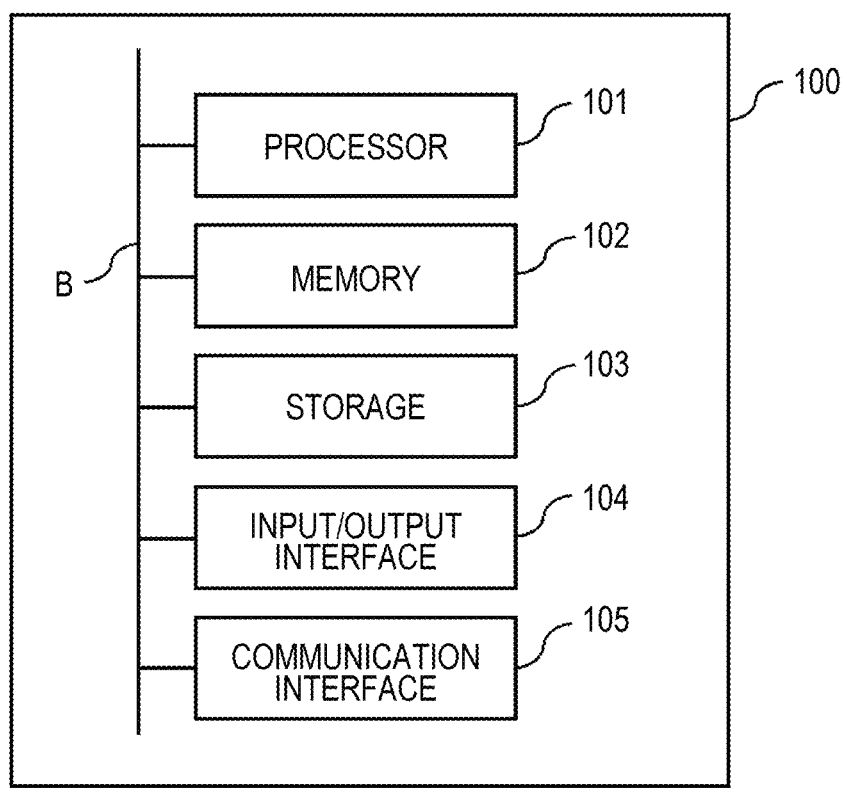
FIG. 4 is a configuration diagram illustrating an example of the hardware configuration of a server apparatus and first information processing apparatuses in accordance with the present disclosure.

The server apparatus 200 in the present disclosure, too, may have the same hardware configuration as in FIG. 4, except otherwise noted.

Next, various functions that can be executed by the first information processing apparatuses 100 and/or the server apparatus 200 achieved by the information processing system 3000 in the present disclosure will be described with reference to the drawings.

Figure 5:
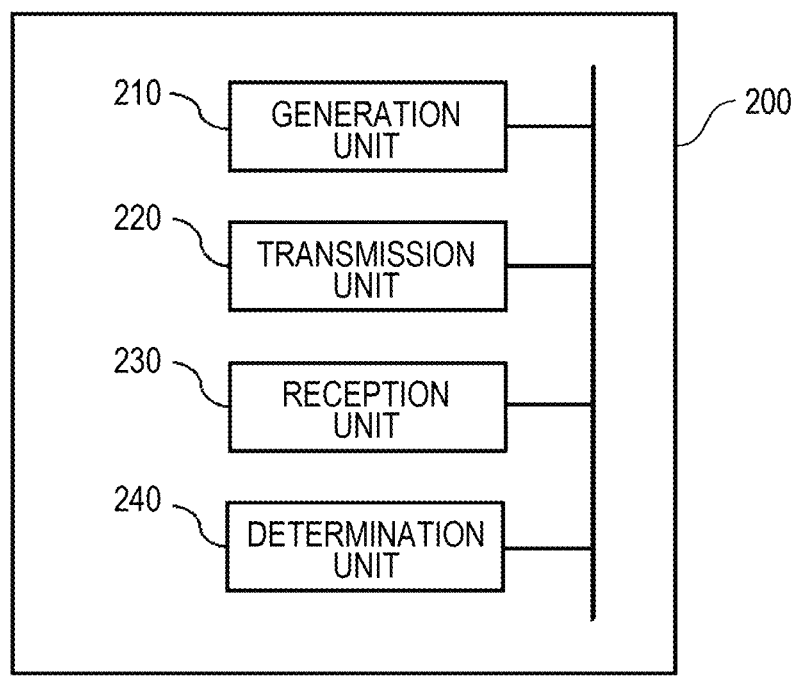
FIG. 5 is a configuration diagram illustrating an example of a functional configuration of the server apparatus.

One or a plurality of computer processors included in the information processing system 3000 in the present disclosure include, as illustrated in FIG. 5, a generation unit 210, a transmission unit 220, a reception unit 230, and a determination unit 240.

Although the generation unit 210, the transmission unit 220, the reception unit 230, and the determination unit 240 will be described as being included in the server apparatus 200, the generation unit 210, the transmission unit 220, the reception unit 230, and the determination unit 240 need not necessarily be included in the server apparatus 200.

The generation unit 210 generates first information for displaying a video on the one or more first information processing apparatuses 100.

The transmission unit 220 then transmits the first information generated by the generation unit 210 to the one or more first information processing apparatuses 100.

The first information generated and transmitted here may be any information that makes the video viewable on the first information processing apparatuses 100. The video may be rendered by the server apparatus 200 or the first information processing apparatuses 100.

Although the first information differs depending on content of the video, the first information includes, when a character object of a streamer appears in the video as described above, for example, motion information indicating motions of the character object, audio information regarding the streamer, and gift object information indicating gifts sent by viewers. The gift object information includes at least gift object identification information for identifying types of gift objects and positional information indicating positions at which the gift objects are to be displayed.

Next, one of the one or more first information processing apparatuses 100 will be focused upon.

Figure 6:
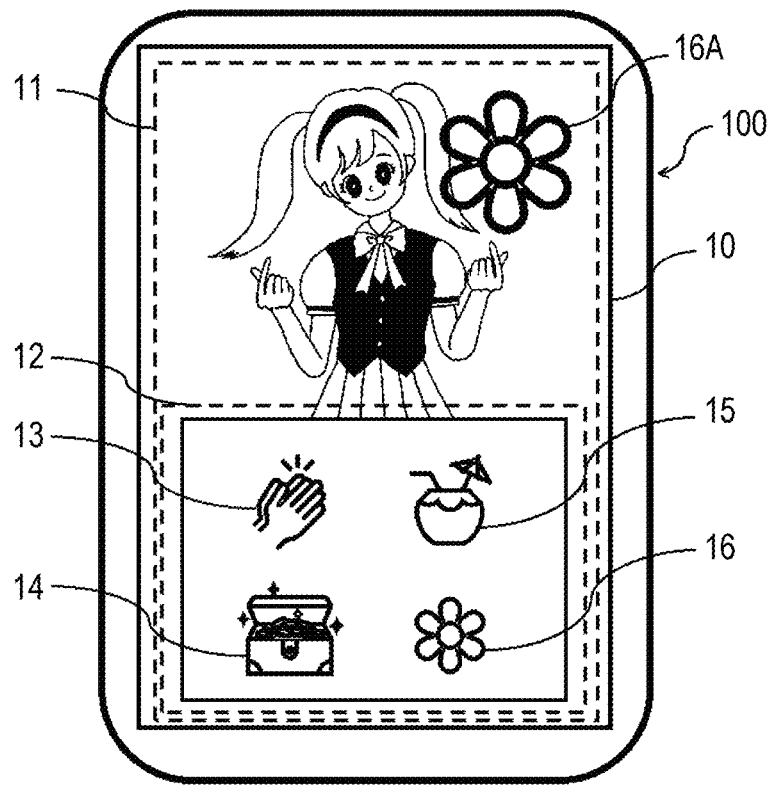
FIG. 6 is a conceptual diagram illustrating an example of a screen displayed on one of the first information processing apparatuses.

FIG. 6 illustrates an example of a screen 10 relating to a video displayed on a display screen of the first information processing apparatus 100.

For example, the screen 10 includes a video display area 11 and an icon display area 12.

A movie (also referred to as a video throughout this disclosure) based on the first information transmitted from the transmission unit 220 is displayed in the video display area 11, and a first icon, which will be described later, is displayed in the icon display area 12. A plurality of first icons may be displayed, instead, and FIG. 6 illustrates an example in which icons 13 to 16 are displayed as first icons.

Figure 7:
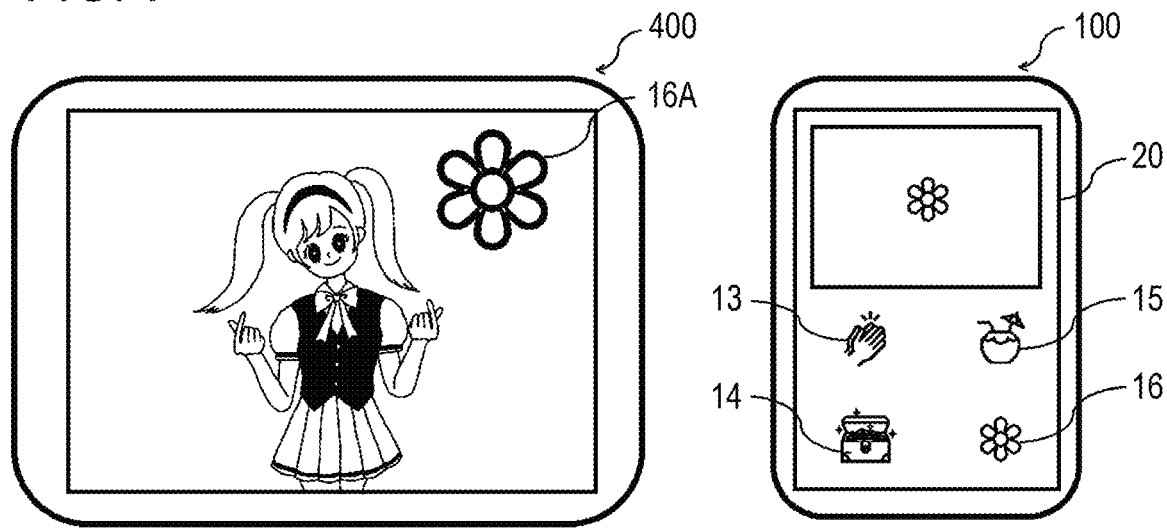
FIG. 7 is a conceptual diagram illustrating an example of a screen displayed on the first information processing apparatus and a display apparatus.

Alternatively, as illustrated in FIG. 7, the first icons may be displayed on a screen 20 of a first information processing apparatus 100 connected, by wire or wirelessly, to a display apparatus 400 on which a movie is displayed. In this case, the transmission unit 220 transmits the first information generated by the generation unit 210 to the display apparatus 400.

The reception unit 230 then receives certain operation information regarding a plurality of certain operation performed on the first icons to take actions on the movie displayed on the first information processing apparatus 100.

An action on a movie may be a request to display an object. When an object is a gift object, an action on a movie is gifting. In the present disclosure, objects include emote objects indicating viewers' emotions. These objects may be still objects or animation objects.

An example of the certain operation may be, for example, a tap on a screen (a click in the case of a terminal without a touch panel. Hereinafter simply referred to as a "tap"). Alternatively, the certain operation may be a combination of a tap and a press (so-called "Force Touch"), a combination of a tap and an acceleration sensor value (a touch with a shake), or the like. A plurality of certain operations will herein refer to a certain operation performed a plurality of times.

The certain operation information may be, for example, identification information regarding a first icon and the number of times that a certain operation has been performed on the first icon. Alternatively, the certain operation information may be, for example, an identification number of an object corresponding to the number of times that a certain operation has been performed on a first icon. In the latter case, a function of the determination unit 240, which will be described later, may be achieved by the first information processing apparatus 100.

A certain operation may be a long press on the screen. In this case, duration of a touch is received as certain operation information regarding a certain operation, not a plurality of certain operations. It is difficult, however, to achieve user consensus on an analog value obtained from pressing. A value larger than expected by the viewer, therefore, might be undesirably transmitted, or a value smaller than expected by the viewer might be undesirably transmitted.

Conventionally, when a gift icon is tapped on a viewer terminal, a request to display a gift object corresponding to the gift icon is immediately transmitted to a server apparatus. Each time a gift icon is tapped, therefore, a server apparatus performs a process for receiving a display request and displaying a gift object in accordance with the received display request.

With the configuration in the present disclosure, on the other hand, the reception unit 230 does not receive information regarding each of a plurality of certain operations but receives certain operation information, which is information regarding all of a plurality of certain operations (e.g., information indicating that an icon associated with a gift identifier (ID) "100001" has been tapped ten times or an identification number of an object associated with ten taps on the icon associated with the gift ID "100001").

The determination unit 240 then determines a display mode of an object corresponding to the first icon on the basis of at least the certain operation information received by the reception unit 230.

That is, the number of objects displayed on a movie is one, regardless of whether the first icon has been tapped ten times or once.

A display mode of an object to be displayed, however, changes on the basis of the above-described certain operation information.

More specifically, the determination unit 240 displays, on the movie on the basis of certain operation information indicating that the first icon 16 has been tapped twice, a flower object 16A larger than when the first icon 16 has been tapped only once.

Similarly, the determination unit 240 displays a bouquet object on the basis of certain operation information indicating that the first icon has been tapped ten times. The size of a bouquet may be the same as that of the flower object 16A at a time when the flower object 16A has been tapped once or that of the flower object 16A at a time when the flower object 16A has been tapped ten times.

A username of a viewer who uses the first information processing apparatus 100 may be embedded in an object of a certain size or larger.

A display mode of an object determined by the determination unit 240 may change stepwise in accordance with certain operation information (e.g., as the number of times increases) or change when a threshold is exceeded.

The generation unit 210 then generates first information for displaying an object on the movie in the display mode determined by the determination unit 240.

A movie is displayed on the first information processing apparatus 100 (or the display apparatus 400) on the basis of first information generated in this manner.

With this configuration, technical improvements for solving or mitigating at least part of the problems of the example of the related art can be provided. More specifically, the problems of an increase in a communication cost, a crowded screen, and an increase in a rendering load can be solved or mitigated, and a streamer's willingness to stream and/or viewers' willingness to view can be improved.

With the configuration in the present disclosure, for example, an increase in a communication cost, a crowded screen, and an increase in a rendering load can be suppressed by combining together a plurality of requests to display the same object issued by the same viewer.

In addition, by determining a display mode of an object to be displayed on the basis of certain operation information, the intensity of a viewer's feelings behind an operation performed by the viewer can be expressed on a movie through an object.

In addition, by designing gifting on an assumption that icons will be tapped repeatedly, viewers' urge to give a lot of gifts can be expressed as repeated taps.

Next, a specific example of certain operation information will be described.

Figure 8:
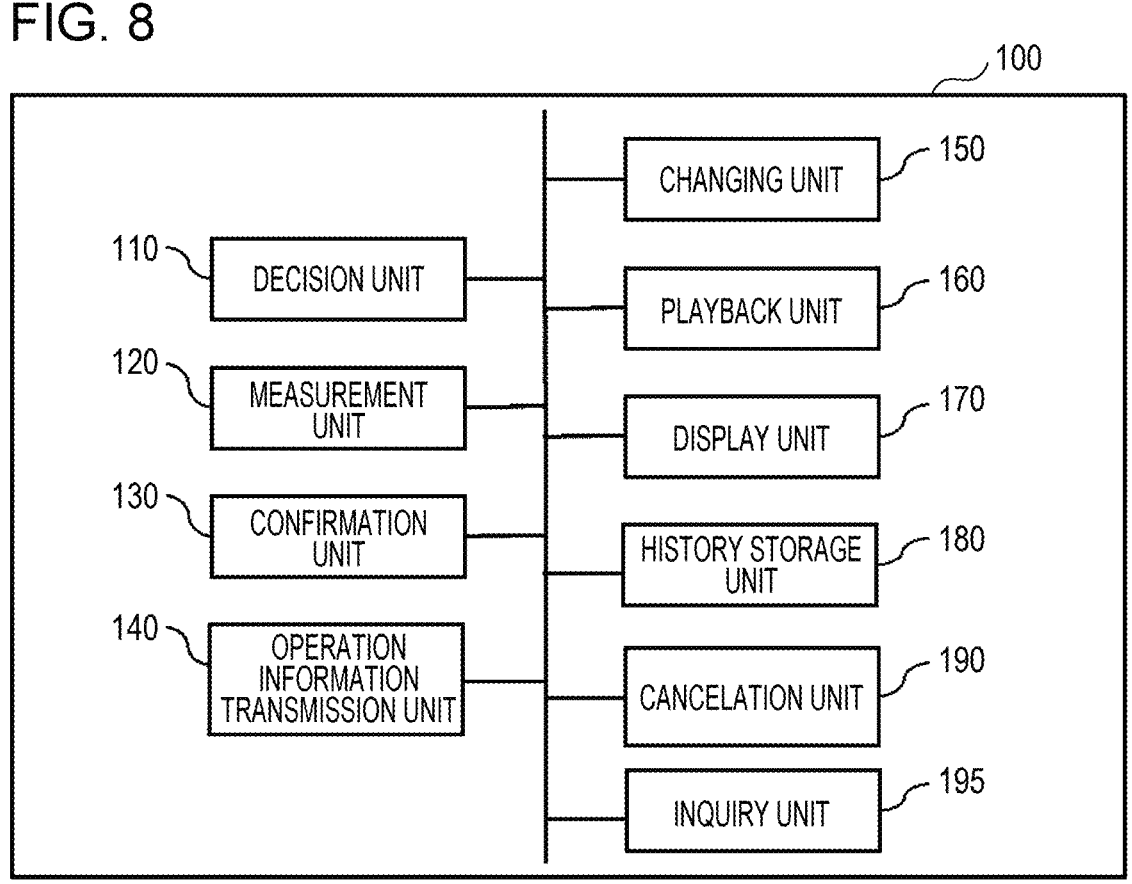
FIG. 8 is a configuration diagram illustrating an example of a functional configuration of the first information processing apparatuses.

As illustrated in FIG. 8, the one or plurality of computer processors included in the information processing system 3000 in the present disclosure may further include a decision unit 110, a measurement unit 120, a confirmation unit 130, and an operation information transmission unit 140.

Here, the decision unit 110, the measurement unit 120, the confirmation unit 130, and the operation information transmission unit 140 will be described as being included in the first information processing apparatus 100, but the decision unit 110, the measurement unit 120, the confirmation unit 130, and the operation information transmission unit 140 need not necessarily be included in the first information processing apparatus 100.

Figure 9:
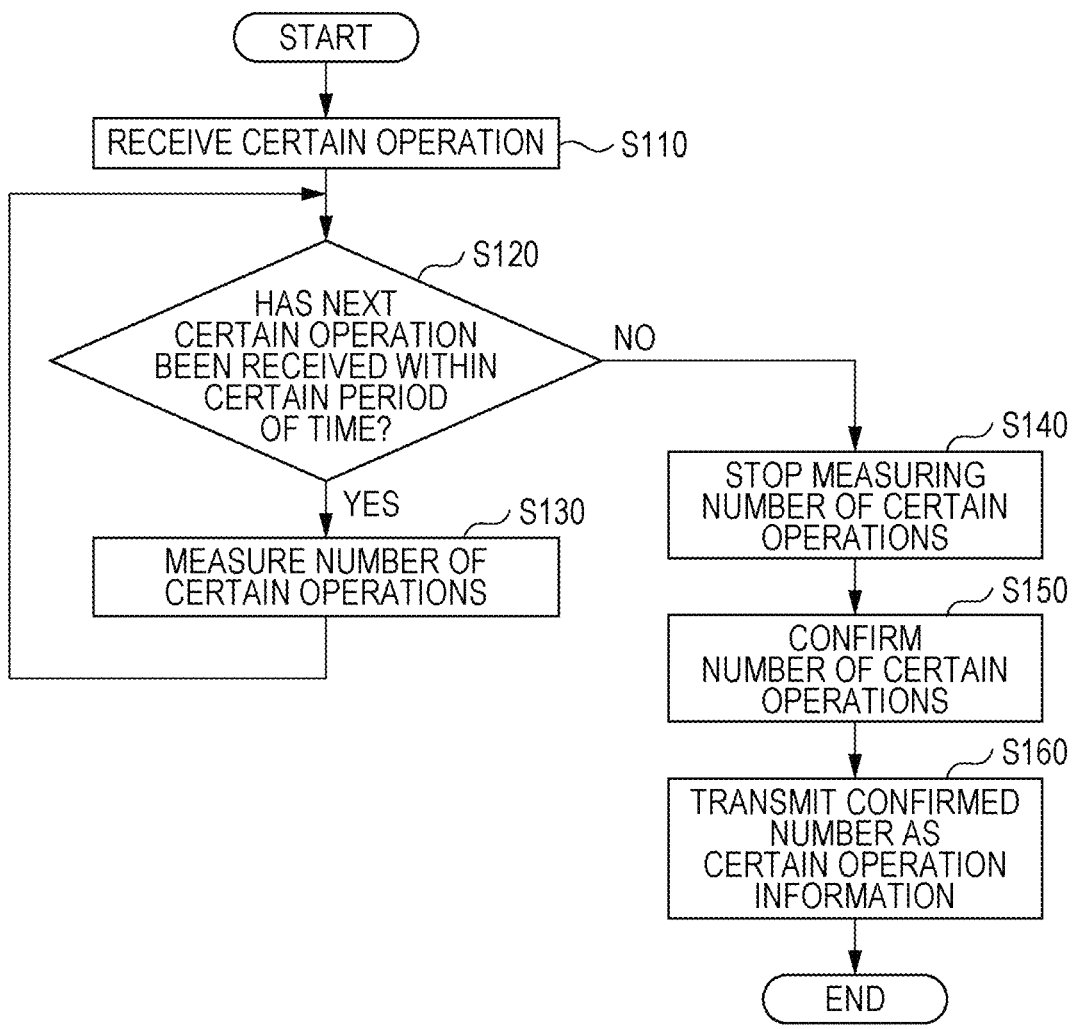
FIG. 9 is a flowchart illustrating an example of a method for processing information.

As illustrated in FIG. 9, the first information processing apparatus 100 receives a certain operation performed on a first icon (S110).

Next, the decision unit 110 decides, for a plurality of certain operations, whether a next certain operation has been performed within a certain period of time from the certain operation (S120).

The certain period of time may be set as repeated taps reception period (Time) as necessary. The repeated taps reception period may be, for example, one second from a last input, but is not limited to this.

If the decision unit 110 decides that a next certain operation has been performed within the certain period of time from the certain operation, the measurement unit 120 measures the number of certain operations (S130). The measurement unit 120 continues to perform the measurement insofar as another certain operation is performed within the certain period of time from a last certain operation. That is, a decision whether another input has been made within the certain period of time from a last input is repeatedly made. More specifically, another input made within the certain period of time from a last input sets a measurement start time for the certain period of time in the decision as a new last input.

If the decision unit 110 decides that a next certain operation has not been performed within the certain period of time from the certain operation, the measurement unit 120 ends the measurement of the number of certain operations (S140).

When the measurement unit 120 ends the measurement, the confirmation unit 130 confirms the number of certain operations (S150).

The operation information transmission unit 140 transmits the number confirmed by the confirmation unit 130 as certain operation information (S160).

The server apparatus 200 receives the certain operation information transmitted from the first information processing apparatus 100.

With this configuration, since the number of successive taps (repeated taps) on a first icon is collectively transmitted as certain operation information, an increase in a communication cost can be prevented.

In addition, the number of repeated taps (the accumulated number of gifts/emotes) is a good indicator of the intensity of a viewer's feelings and suitable as a parameter for determining a display mode of an object.

In addition, as illustrated in FIG. 8, the one or plurality of computer processors included in the information processing system 3000 in the present disclosure may further include a changing unit 150.

If the decision unit 110 decides that a next certain operation has been performed within the certain period of time from a certain operation, the changing unit 150 changes a display mode of a first icon.

Figure 10:
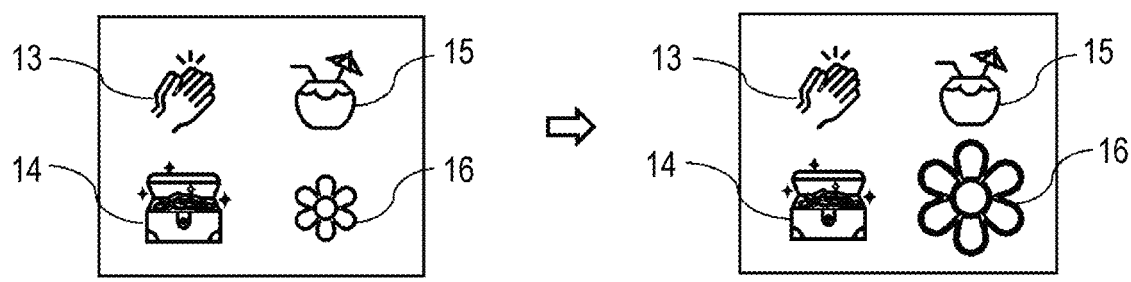
FIG. 10 is a conceptual diagram illustrating an example of a display mode of a first icon.

FIG. 10 illustrates how a display mode of a first icon changes and an example where a first icon 16 is displayed larger on a screen.

For example, the changing unit 150 may increase a display size of a first icon stepwise as the number of certain operations increases.

Alternatively, the changing unit 150 may change an image of a first icon to another image, instead of changing the size of the first icon.

The other image may be an image of an object actually displayed in accordance with the number.

Figure 11:
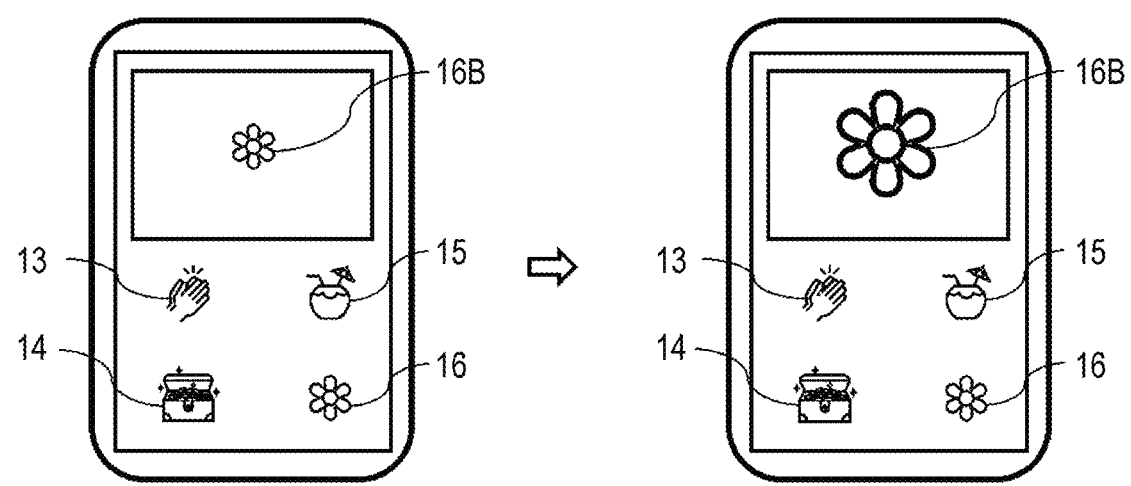
FIG. 11 is a conceptual diagram illustrating an example of a display mode of an object.

In an example illustrated in FIG. 11, when the first icon 16 is tapped, a corresponding image 16B is displayed in an upper display area. In the present disclosure, if the decision unit 110 decides that a next certain operation has been performed within the certain period of time from a certain operation, the changing unit 150 may change a display mode of the corresponding image 16B.

The first information processing apparatus 100 can thus perform an animation process in which a first icon or a corresponding image is increased or reduced in size in accordance with taps.

When an applicable gift or emote becomes larger in front of a viewer's eyes (on the viewer's client terminal) as in the above configuration, the following advantageous effects are expected.

- The viewer can easily understand that his/her taps have effects
- Since a gift or an emote becomes larger in front of the viewer's eyes as a result of each press, the viewer is likely to desire to press the gift or the emote many times.
- By changing information to be displayed in accordance with the number of repeated taps, various functions and expressions can be achieved while keeping a user interface simple.
- Since a gift or an emote as large as one sent to a streamer is displayed on a client page or a streaming screen, the gift or the emote sent by the viewer is distinguished from gifts or emotes sent by others, and the viewer's sense of contribution to streaming increases.
- Communication with the server is performed only once at an end of repeated taps, and a communication cost can be reduced compared to when a conventional method, in which communication with the server is performed for each tap to send a gift, is used.

As illustrated in FIG. 8, the one or plurality of computer processors included in the information processing system 3000 in the present disclosure may further include a playback unit 160.

If the decision unit 110 decides that a next certain operation has been performed within the certain period of time from a certain operation, the playback unit 160 plays back a sound effect based on the number of certain operations.

For example, the sound effect played back by the playback unit 160 may get higher or lower stepwise as the number of certain operations increases. In addition, when the number of certain operations reaches a certain threshold or an upper limit, the playback unit 160 may play back a special sound effect such as a fanfare. If the number of certain operations does not reach the certain threshold or the upper limit, the playback unit 160 may play back a special sound effect such as a failure sound (regret sound).

The operation information transmission unit 140 may transmit the number as certain operation information after the confirmation unit 130 confirms the number.

Figure 12:
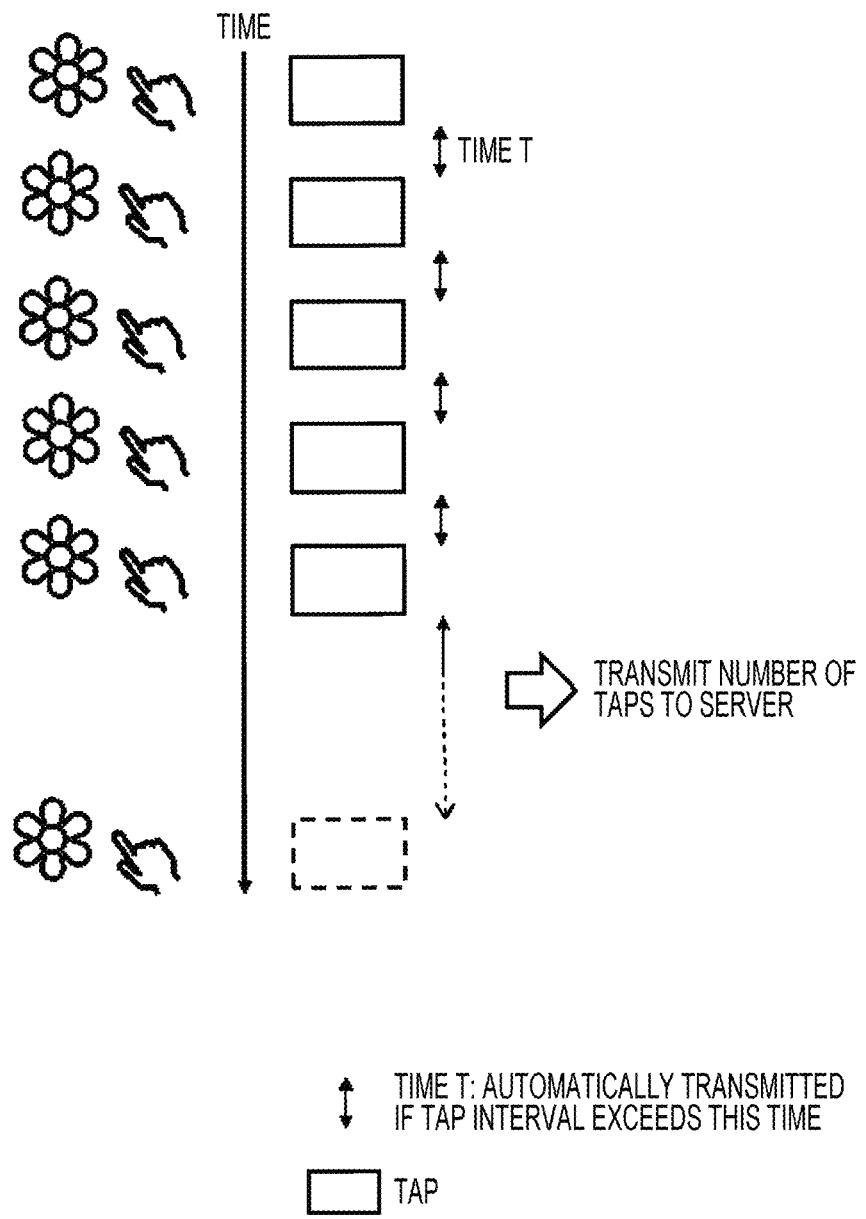
FIG. 12 is a conceptual diagram illustrating an example of a timing at which the number of taps is transmitted to the server apparatus.

More specifically, as illustrated in FIG. 12 as an example, while taps on a first icon are being performed at intervals of time T or shorter, the number is not confirmed. If another tap is not performed until the time T elapses from a previous tap, the number is confirmed, and the confirmed number is transmitted to the server apparatus 200 as certain operation information. In the example illustrated in FIG. 12, information indicating that the number of successive taps (repeated taps) on the first icon is five is transmitted to the server apparatus 200. Even if another tap is performed after the time T elapses from a previous tap, the tap is not included in the number.

Alternatively, after the confirmation unit 130 confirms the number, the operation information transmission unit 140 may transmit the number as certain operation information in accordance with an instruction from the first information processing apparatus 100.

Figure 13:
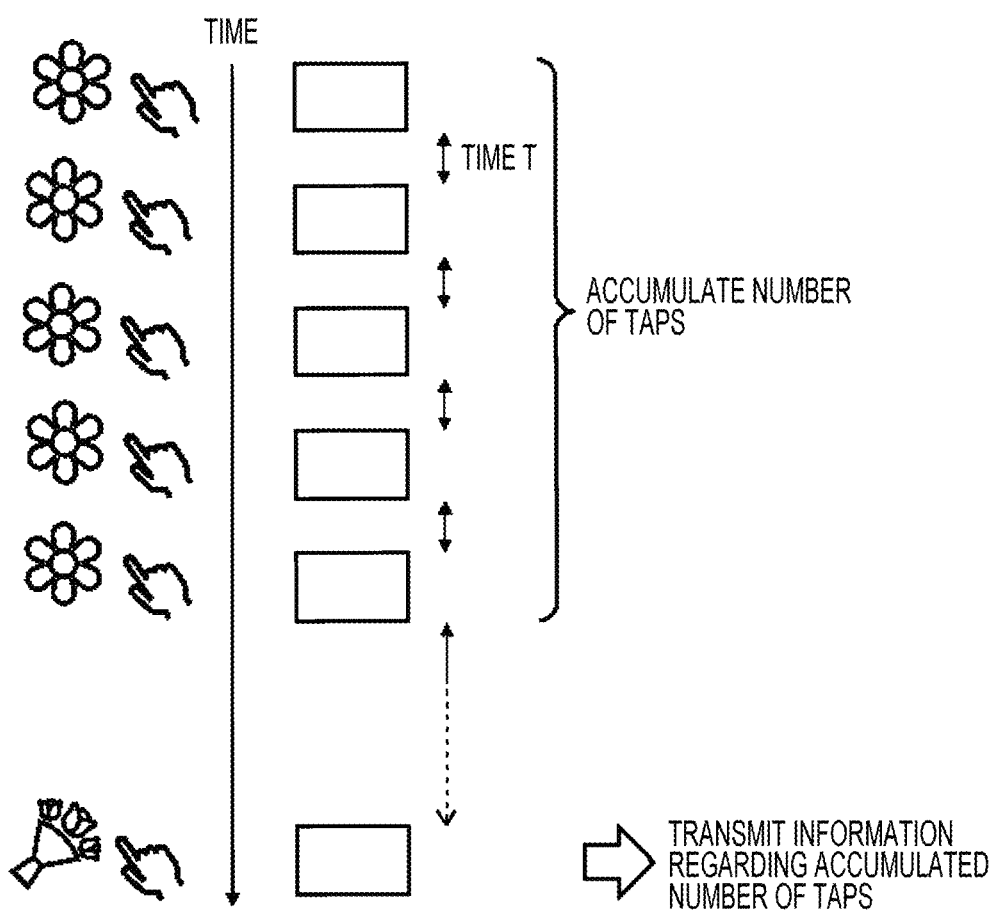
FIG. 13 is a conceptual diagram illustrating another example of the timing at which the number of taps is transmitted to the server apparatus.

More specifically, as illustrated in FIG. 13, the same process as in FIG. 12 is performed until the number is confirmed, but certain operation information is not immediately transmitted to the server apparatus 200 after the confirmation but transmitted in accordance with an instruction from a viewer.

A first tap on the first icon after the confirmation may be determined as an instruction from the viewer, or an operation performed on a second icon, which will be described later, may be determined as an instruction from the viewer.

If there is a communication failure in the first information processing apparatus 100, certain operation information is automatically transmitted without an instruction.

As illustrated in FIG. 8, the one or plurality of computer processors included in the information processing system 3000 in the present disclosure may further include a display unit 170.

The display unit 170 displays, on the first information processing apparatus 100, a second icon for receiving the above-mentioned instruction.

Figure 14A:
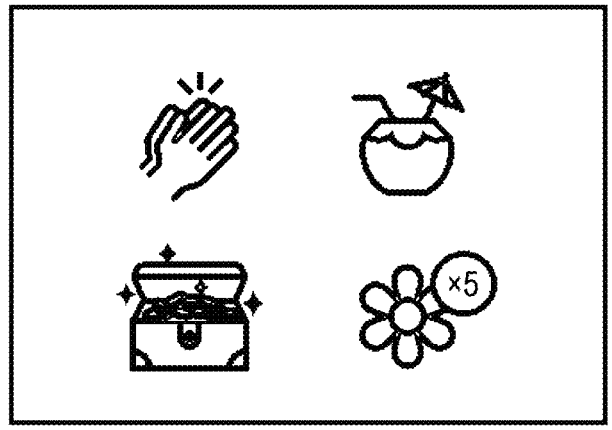
FIGS. 14A to 14C are conceptual diagrams illustrating other examples of the first icon.
Figure 14B:
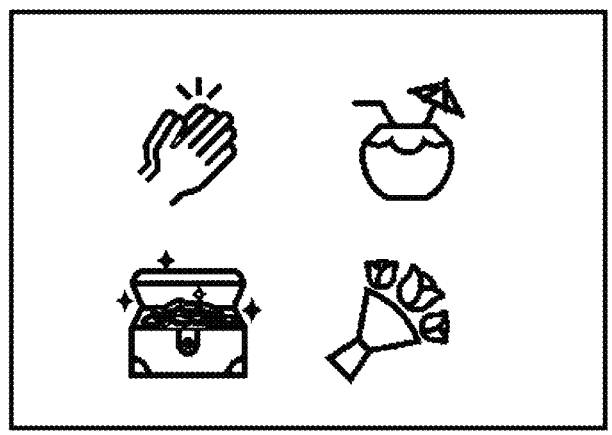
Figure 14C:
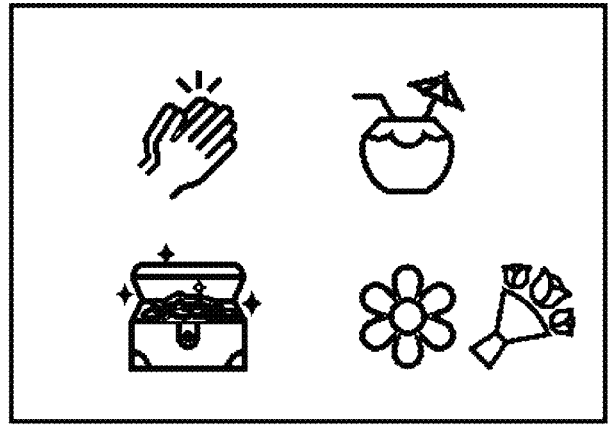

The second icon may be displayed instead of, or in addition to, the first icon. The second icon may be displayed in any mode in which it can be understood that the number or identification information regarding an object will be transmitted as certain operation information. For example, the second icon may be the first icon with the number of taps (FIG. 14A), an icon of an object corresponding to five taps (FIG. 14B), or the first icon with the icon of the object corresponding to five taps (FIG. 14C).

As illustrated in FIG. 8, the one or plurality of computer processors included in the information processing system 3000 in the present disclosure may further include a history storage unit 180.

The history storage unit 180 stores history information regarding the number confirmed by the confirmation unit 130.

The history information may indicate the number transmitted last time or the largest number transmitted in the past.

At this time, the display unit 170 displays, on the first information processing apparatus 100, a third icon generated on the basis of the history information stored in the history storage unit 180.

The third icon may be displayed instead of, or in addition to, the first icon. The third icon may be displayed in any mode in which it can be understood that the number or identification information regarding an object based on the history information will be transmitted as certain operation information. As illustrated in FIGS. 14A to 14C as examples of the second icon, the third icon may be the first icon with the number of taps, the icon of the object corresponding to five taps, or the first icon with the icon of the object corresponding to five taps.

If a certain operation is performed on the third icon, the operation information transmission unit 140 may transmit certain operation information while assuming that a plurality of certain operations have been performed on the first icon.

Alternatively, the measurement unit 120 may increase, in the measurement, the accumulated number stored in the past as the history information, instead of the method in which the display unit 170 displays the third icon.

Although the generation unit 210 generates the first information immediately after the determination in the above description, the generation unit 210 may generate the first information after receiving an instruction from the first information processing apparatus 100 or another information processing apparatus. Alternatively, the generation unit 210 may generate the first information immediately after the determination, but a viewer or a streamer may determine when to display the first information.

That is, the first information may be added to a waiting list of the server, and the streamer may display the first information at any timing.

With this configuration, a viewer need not repeatedly tap again and it is more likely that a streamer receives a gift corresponding to repeated taps, which are advantageous.

If the number of certain operations measured by the measurement unit 120 reaches a certain value, the operation information transmission unit 140 may transmit the certain value as temporary operation information before the confirmation unit 130 confirms the number.

Figure 15:
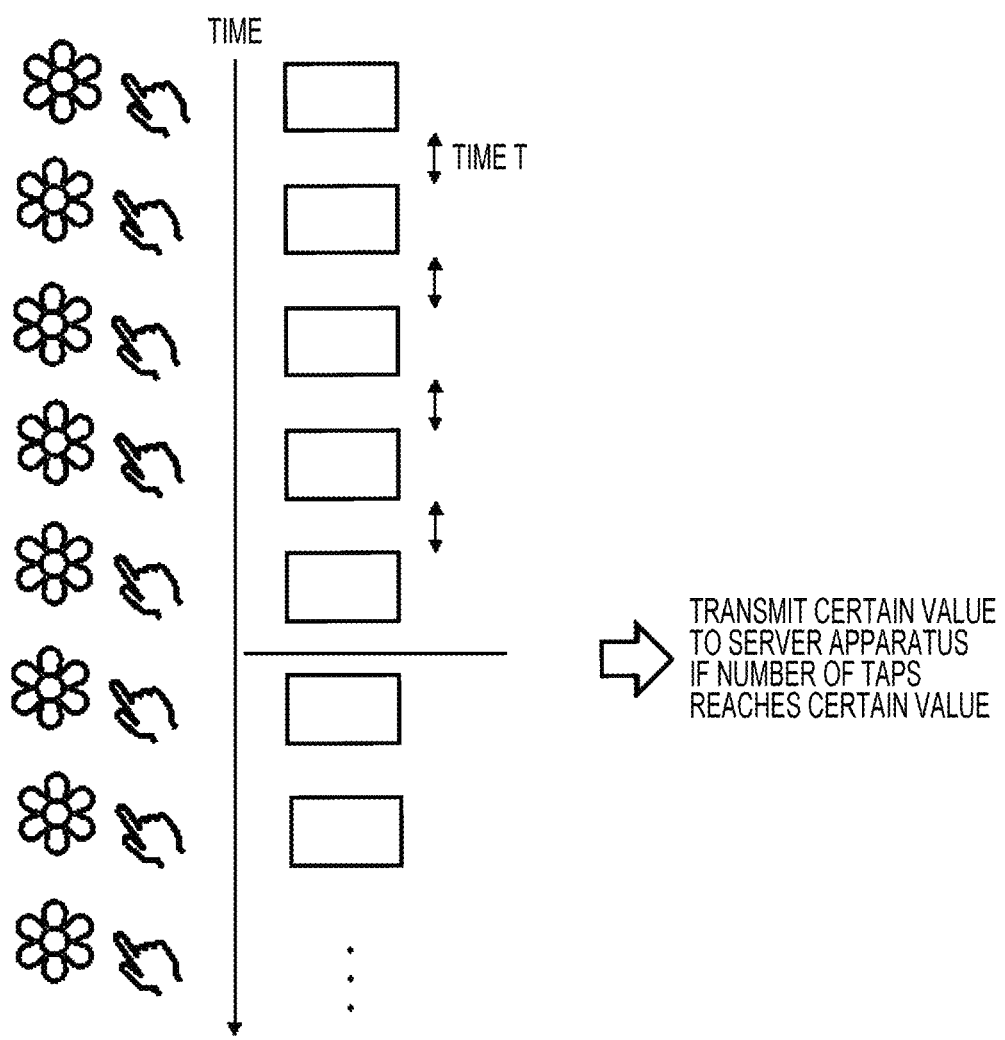
FIG. 15 is a conceptual diagram illustrating another example of the timing at which the number of taps is transmitted to the server apparatus.

More specifically, as illustrated in FIG. 15 as an example, if the number of taps reaches the certain value while taps on a first icon are being performed at the intervals of the time T or shorter, the operation information transmission unit 140 automatically transmits the certain value to the server apparatus 200. At this time, the measurement unit 120 continues the measurement.

The decision unit 110 may also decide whether a cancelation operation has been performed within a certain period of time from a certain operation.

The cancelation operation may be an operation performed while performing taps. Examples of the operation include a swipe, a long press, an operation with two fingers, or pressing of a certain physical button included in the first information processing apparatus 100.

At this time, as illustrated in FIG. 8, the one or plurality of computer processors included in the information processing system 3000 in the present disclosure may further include a cancelation unit 190.

If the decision unit 110 decides, after the number of certain operations measured by the measurement unit 120 reaches the certain value, that a cancelation operation has been performed, the cancelation unit 190 cancels certain operations after the certain value is reached.

If the decision by the decision unit 110 is made before the number of certain operations measured by the measurement unit 120 reaches the certain value, the cancelation unit 190 cancels all certain operations.

Alternatively, if the decision unit 110 decides that a cancelation operation has been performed, the cancelation unit 190 may display a dialog box for inquiring whether to cancel certain operations and, only if the viewer agrees, cancel the certain operations.

With this configuration, the viewer's dissatisfaction due to a malfunction can be avoided, and a loss of sales caused by cancelation can be minimized.

When the reception unit 230 receives the certain value as temporary operation information, the generation unit 210 can generate information for displaying, in a different display mode, a first icon displayed on a first information processing apparatus other than the first information processing apparatus 100, and the transmission unit 220 can transmit the information to the other first information processing apparatus.

Here, the display mode of the first icon may be changed, for example, by attaching a flame mark to the first icon, changing a color of the first icon, or attaching a notification badge to the first icon.

With this configuration, other viewers can be informed that the viewer is repeatedly tapping (accumulating) the first icon, and the other viewers can be provoked to tap repeatedly.

As illustrated in FIG. 8, the one or plurality of computer processors included in the information processing system 3000 in the present disclosure may further include an inquiry unit 195.

If the decision unit 110 decides that a next certain operation has not been performed within the certain period of time from a certain operation, the inquiry unit 195 displays, before the measurement unit 120 ends the measurement of the number of certain operations, an inquiry screen on the first information processing apparatus 100 to inquire about a will to continue.

Factors that may prevent a next certain operation from being performed include the viewer's will and other causes. The latter case includes a lack of coins, an operation error, and a communication failure.

In the latter case, the viewer is willing to continue, but a next certain operation is not possible.

Information displayed in the inquiry screen may be determined on the basis of a result of an analysis of a factor that has prevented a next certain operation from being performed.

More specifically, if it is determined as a result of the analysis that the factor is a lack of coins, an additional charge dialog is displayed as the inquiry screen, and if the viewer makes an additional payment, it is determined that the viewer is willing to continue.

A time limit may be may be set for the display of the dialog.

If the inquiry unit 195 confirms the viewer's will to continue, the measurement unit 120 continues to measure the number of certain operations.

If the inquiry unit 195 does not confirm the viewer's will to continue, on the other hand, the measurement unit 120 ends the measurement of the number of certain operations.

The confirmed number is then transmitted to the server apparatus.

Although an increase in the size of an object, growth of an object, and a change to an object have been mainly described as examples of a display mode of the object to be employed in the above description, the size of an object can be increased by changing parameters set for the object from reference values.

More specifically, the determination unit 240 can determine a display mode by setting, on the basis of certain operation information, the amount of change from a reference value of at least one of the parameters set for an object, namely display size, transparency, moving speed, and motion.

The parameter of display size corresponds to the above-described magnification rate (Mag). The size of an object displayed through a tap is set as a reference value, and the amount of change from the reference value is determined as the magnification rate.

The parameter of transparency is a degree of transparency (Alpha). A degree of transparency of an object displayed through a tap is set as a reference value, and the amount of change from the reference value is determined.

The parameter of moving speed is the speed of an animation (Speed). The amount of change from a reference value is determined.

The parameter of motion (a way of moving and duration) is a motion of an animation (Move). The amount of change from a reference value is determined.

These parameters may be given to a rendering side (the server apparatus or another viewer terminal/streamer terminal) as dynamic parameters representing behavior of an object (behavior that can be represented by the parameters).

The determination unit 240 may also determine a display mode of an object on the basis of a certain parameter as well as certain operation information.

The certain parameter is a parameter relating to at least the number of concurrent users of a movie, a sales condition of a movie, or a progress state of a movie.

The parameter relating to the number of concurrent users (CCU) of a movie is a parameter relating to how busy a server is. When the parameter relating to the number of concurrent users is large, the magnification rate (Mag) is reduced so that an object does not become large and a screen is prevented from becoming crowded. In addition, a communication band can also be prevented from becoming crowded by increasing the repeated taps reception period (Time).

The sales condition of a movie is a parameter based on the amount of money raised through gifting. When the parameter is small, the magnification rate (Mag) is reduced so that an object does not become large, and the repeated taps reception period (Time) is increased to urge repeated taps.

The progress state of a movie is a parameter relating to how a streamer directs a movie. When a streamer desires to display a large number of small emote objects in consideration of the nature of a program, for example, the repeated taps reception period (Time) and the magnification rate (Mag) are reduced. In addition, a production side can control a state of a movie to a certain degree by, for example, reducing the speed of an animation (Speed) and increasing the degree of transparency (Alpha) in a scene where a ballad is played. These parameters may be specified in advance, or dynamically adjusted in accordance with the streamer's voice.

The certain parameter may be a parameter relating to a screen size of the first information processing apparatus 100 or the display apparatus 400, instead.

More specifically, when the screen size is small, the magnification rate (Mag) is reduced so that an object does not become large.

Alternatively, the certain parameter may be a parameter relating to a value of a first icon or an average operation interval of certain operations performed on the first icon.

The value of a first icon may be the number of coins necessary to give a request to display an object corresponding to the first icon, that is, a unit price of a gift or an emote. The repeated taps reception period (Time) and the magnification rate (Mag) are adjusted in accordance with the unit price of a gift or an emote so that gifts or emotes can be sent for a long period of time.

The parameter relating to an average operation interval of certain operations performed on a first icon can be calculated by including operation intervals (ms) in information regarding taps transmitted to the server apparatus and collecting the information. A repeated taps reception period (Time) optimal for the viewer is then calculated from the average operation interval and updated. That is, the repeated taps reception period (Time) can be dynamically changed in accordance with an actual tap frequency of the viewer.

These certain parameters are used as components of importance parameters.

As described above, if a large number of objects are displayed on a screen in accordance with viewers' desire to send a lot of gifts or emotes and a manager's desire to display a lot of gifts or emotes as in the method disclosed in the example of the related art, the screen becomes hardly visible and the amount of processing of particles becomes large. When the screen is hardly visible, it is difficult to perform operations, and viewers who have not sent gifts or emotes become undesirably satisfied.

With the above configuration, however, the above problems can be solved by representing each gift or emote as a "weight (importance, behavior)", not treating each gift or emote as a combination of an agreement set for the gift or the emote and a request to display the gift or the emote.

According to the present disclosure, any animation can be attached to a gift, and diverse expressions become possible with a simple UI. More specifically, a type, a size, and a motion of an emote can be adjusted on the basis of the number of repeated taps (or duration, pressure, acceleration, etc.)

In addition, even if an emote is tapped many times, the communication cost remains the same, that is, a service provider can control data traffic of each viewer in unit time. When a threshold interval for determining repeated taps is set to one second, for example, one viewer can send a maximum of one gift in one second. As a result, annoying behavior such as filling up a screen with a barrage of free gifts or the like can be prevented. Similarly, attacks by machines can be prevented in advance.

Although a client terminal collects emotes in the above example, a server may collect emotes, instead. With this configuration, the same emote sent by a plurality of viewers can be combined together.

Next, a method for processing information according to the embodiment of the present disclosure will be described.

The method for processing information according to the embodiment of the present disclosure is used by the information processing system 3000 illustrated in FIG. 3. The information processing system 3000 includes the one or more first information processing apparatuses 100 and the server apparatus 200.

Figure 16:
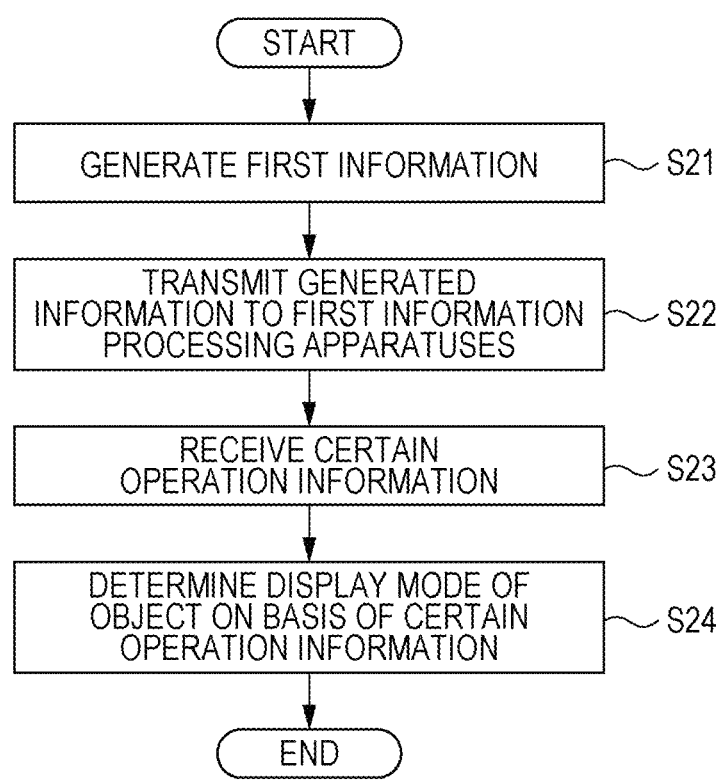
FIG. 16 is a flowchart illustrating another example of the method for processing information.

As illustrated in FIG. 16 as an example, the method for processing information in the present disclosure causes the one or plurality of computer processors included in the information processing system 3000 to perform generation step S21, transmission step S22, reception step S23, and determination step S24.

In generation step S21, first information for displaying a movie on the one or more first information processing apparatuses 100 is generated. Generation step S21 may be performed by the generation unit 210.

Generation step S21 may be performed by a server side (server apparatus 200) or a client side (first information processing apparatuses 100), instead.

In transmission step S22, the first information generated in generation step S21 is transmitted to the one or more first information processing apparatuses 100. Transmission step S22 may be performed by the transmission unit 220.

Transmission step S22 may be performed by the server side (server apparatus 200) or the client side (first information processing apparatuses 100), instead.

In reception step S23, certain operation information regarding a plurality of certain operations performed on a first icon to take an action on a movie displayed on one of the first information processing apparatuses 100 is received. Reception step S23 may be performed by the reception unit 230.

Reception step S23 may be performed by the server side (server apparatus 200) or the client side (first information processing apparatus 100).

In determination step S24, a display mode of an object corresponding to the first icon is determined on the basis of at least the certain operation information received in reception step S23. Determination step S24 may be performed by the determination unit 240.

Determination step S24 may be performed by the server side (server apparatus 200) or the client side (first information processing apparatus 100).

In generation step S21, first information for displaying the object on the movie in the display mode determined in determination step S24 is generated.

With this configuration, technical improvements for solving or mitigating at least part of the problems of the example of the related art can be provided. More specifically, the problems of an increase in a communication cost, a crowded screen, and an increase in a rendering load can be solved or mitigated, and a streamer's willingness to stream and/or viewers' willingness to view can be improved.

Next, a computer program according to the embodiment of the present disclosure will be described.

As illustrated in FIG. 3, the computer program according to the embodiment of the present disclosure is executed by the information processing system 3000 that streams a movie. The information processing system 3000 includes the first information processing apparatuses 100 and the server apparatus 200.

The computer program in the present disclosure causes the one or plurality of processors included in the information processing system 3000 to achieve a generation function, a transmission function, a reception function, and a determination function.

The generation function is used to generate first information for displaying a movie on the one or more first information processing apparatuses 100.

The transmission function is used to transmit the first information generated by the generation function to the one or more first information processing apparatuses 100.

The reception function is used to receive certain operation information regarding a plurality of certain operations performed on a first icon to take an action on a movie displayed on one of the first information processing apparatuses 100.

The determination function is used to determine a display mode of an object corresponding to the first icon on the basis of at least the certain operation information received by the reception function.

The generation function is used to generate information for displaying the object on the movie in the display mode determined by the determination function.

Figure 17:
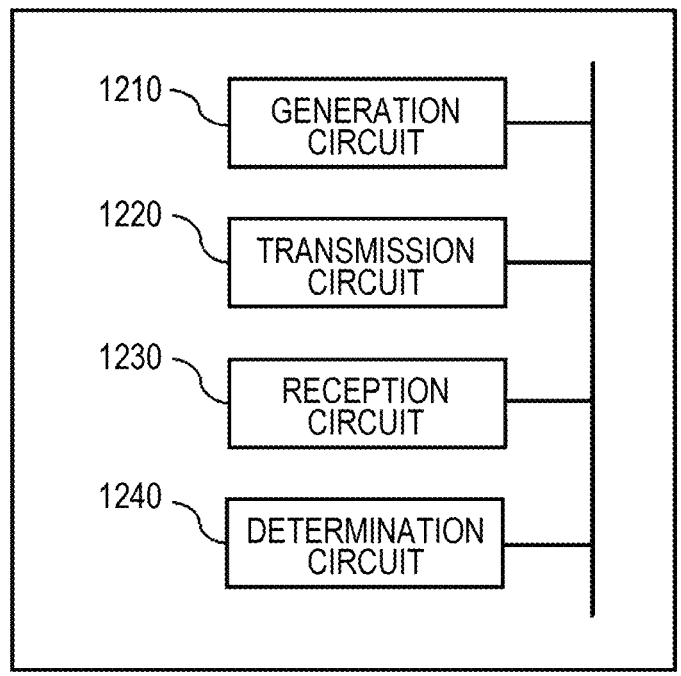
FIG. 17 is a circuit configuration diagram illustrating a circuit configuration for executing a computer process in accordance with the present disclosure.

The functions may be achieved by a generation circuit 1210, a transmission circuit 1220, a reception circuit 1230, and a determination circuit 1240, respectively, illustrated in FIG. 17. The generation circuit 1210, the transmission circuit 1220, the reception circuit 1230, and the determination circuit 1240 are achieved by the generation unit 210, the transmission unit 220, the reception unit 230, and the determination unit 240, respectively. Details of these components are as described above.

With this configuration, technical improvements for solving or mitigating at least part of the problems of the example of the related art can be provided. More specifically, an information processing system capable of improving a streamer's willingness to stream and/or viewers' willingness to view can be provided.

Next, the information processing apparatus according to the embodiment of the present disclosure will be described. The information processing apparatus corresponds to one of the first information processing apparatuses 100 included in the information processing system 3000.

Figure 18:
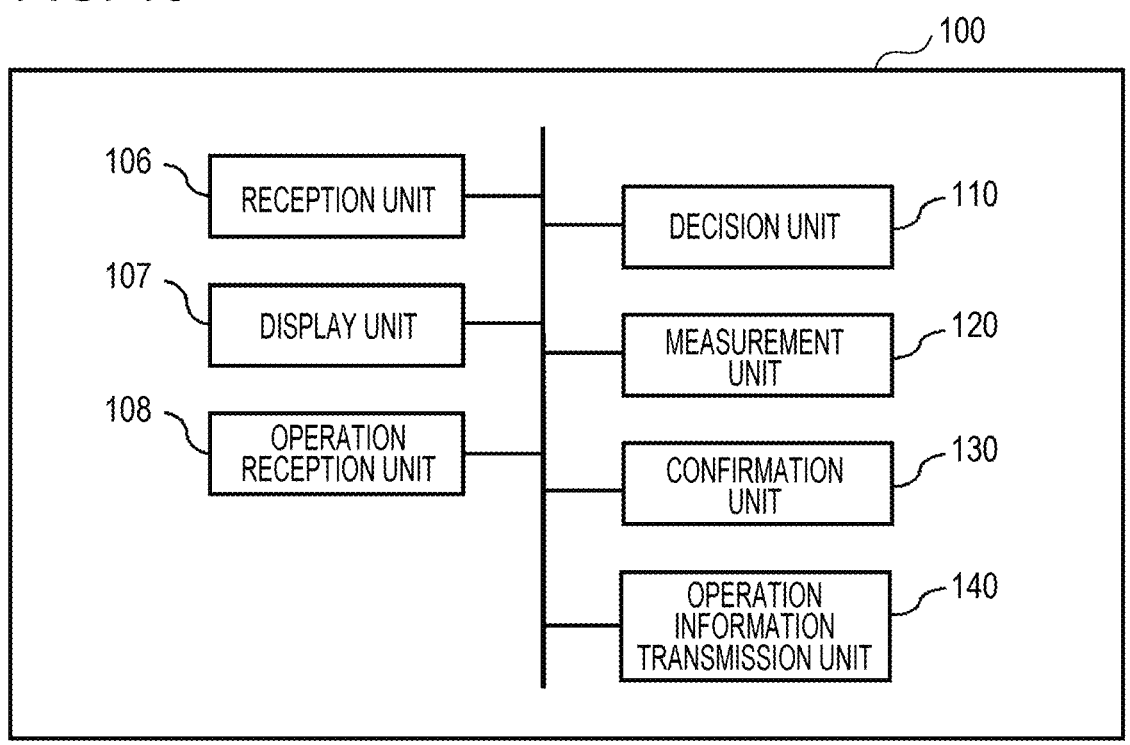
FIG. 18 is a configuration diagram illustrating another example of the functional configuration of the first information processing apparatuses.

As illustrated in FIG. 18, the information processing apparatus includes a reception unit 106, a display unit 107, an operation reception unit 108, a decision unit 110, a measurement unit 120, a confirmation unit 130, and an operation information transmission unit 140.

The reception unit 106 receives first information for displaying a movie.

The display unit 107 displays, on the basis of the first information received by the reception unit 106, the movie and a first icon for taking an action on the movie.

The operation reception unit 108 receives a certain operation performed on the first icon.

The decision unit 110 decides whether a next certain operation has been performed within a certain period of time from a certain operation. The decision unit 110 is as described above.

If the decision unit 110 decides that a next certain operation has been performed within the certain period of time from a certain operation, the measurement unit 120 measures the number of certain operations. If the decision unit 110 decides that a next certain operation has not been performed within the certain period of time from a certain operation, the measurement unit 120 ends the measurement of the number of certain operations. The measurement unit 120 is as described above.

When the measurement unit 120 ends the measurement, the confirmation unit 130 confirms the number of certain operations. The confirmation unit 130 is as described above.

The operation information transmission unit 140 transmits the number confirmed by the confirmation unit 130 to the server apparatus as certain operation information. The operation information transmission unit 140 is as described above.

With this configuration, technical improvements for solving or mitigating at least part of the problems of the example of the related art can be provided. More specifically, an information processing system capable of improving a streamer's willingness to stream and/or viewers' willingness to view can be provided.

Next, another method for processing information according to the embodiment of the present disclosure will be described. The method for processing information is executed by the information processing apparatus.

Figure 19:
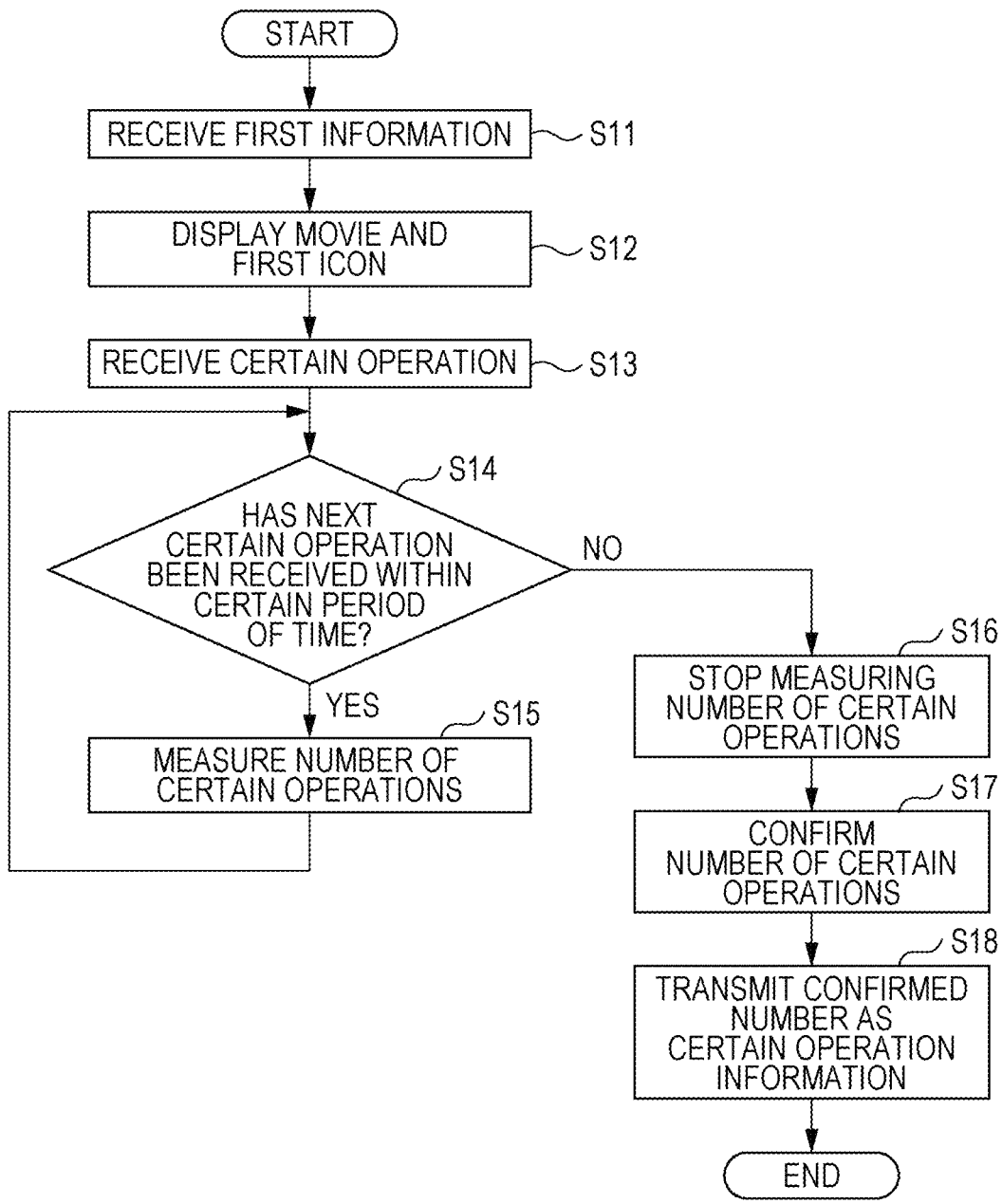
FIG. 19 is a flowchart illustrating another example of the method for processing information.

As illustrated in FIG. 19 as an example, the method for processing information in the present disclosure causes the one or plurality of computer processors included in the information processing apparatus to perform reception step S11, display step S12, operation reception step S13, decision step S14, measurement steps S15 and S16, confirmation step S17, and operation information transmission step S18.

In reception step S11, first information for displaying a movie is received. Reception step S11 may be performed by the reception unit 106.

In display step S12, the movie and a first icon for taking an action on the movie are displayed on the basis of the first information received in reception step S11. Display step S12 may be performed by the display unit 107.

In operation reception step S13, a first certain operation performed on the first icon is received. Operation reception step S13 may be performed by the operation reception unit 108.

In decision step S14, whether a next certain operation has been performed within a certain period of time from a certain operation is decided. Decision step S14 may be performed by the decision unit 110.

In the measurement steps, if it has been determined in decision step S14 that a next certain operation has been performed within the certain period of time from a certain operation, the number of certain operations is measured (S15), or if it has been determined in decision step S14 that a next certain operation has not been performed within the certain period of time from a certain operation, the measurement of the number of certain operations ends (S16). Measurement step S15 may be performed by the measurement unit 120.

In confirmation step S17, the number of certain operations is confirmed when the measurement ends in measurement step S16. Confirmation step S17 may be performed by the confirmation unit 130.

In operation information transmission step S18, the number confirmed in confirmation step S17 is transmitted to the server apparatus as certain operation information. Operation information transmission step S18 may be performed by the operation information transmission unit 140.

With this configuration, technical improvements for solving or mitigating at least part of the problems of the example of the related art can be provided. More specifically, an information processing system capable of improving a streamer's willingness to stream and/or viewers' willingness to view can be provided.

Lastly, another computer program according to the embodiment of the present disclosure will be described. The computer program is executed by the information processing apparatus.

The computer program in the present disclosure causes the one or plurality of computer processors included in the information processing system to achieve a reception function, a display function, an operation reception function, a decision function, a measurement function, a confirmation function, and an operation information transmission function.

The reception function is used to receive first information for displaying a movie.

The display function is used to display the movie and a first icon for taking an action on the movie on the basis of the first information received by the reception function.

The operation reception function is used to receive a certain operation performed on the first icon.

The decision function is used to decide whether a next certain operation has been performed within a certain period of time from a certain operation.

If it is determined by the decision function that a next certain operation has been performed within the certain period of time from a certain operation, the measurement function is used to measure the number of certain operations. If it is decided by the decision function that a next certain operation has not been performed within the certain period of time from a certain operation, the measurement function is used to end the measurement of the number of certain operations.

The confirmation function is used to confirm the number of certain operations when the measurement function ends the measurement.

The transmission function is used to transmit the number confirmed by the confirmation function to the server apparatus 200 as certain operation information.

Figure 20:
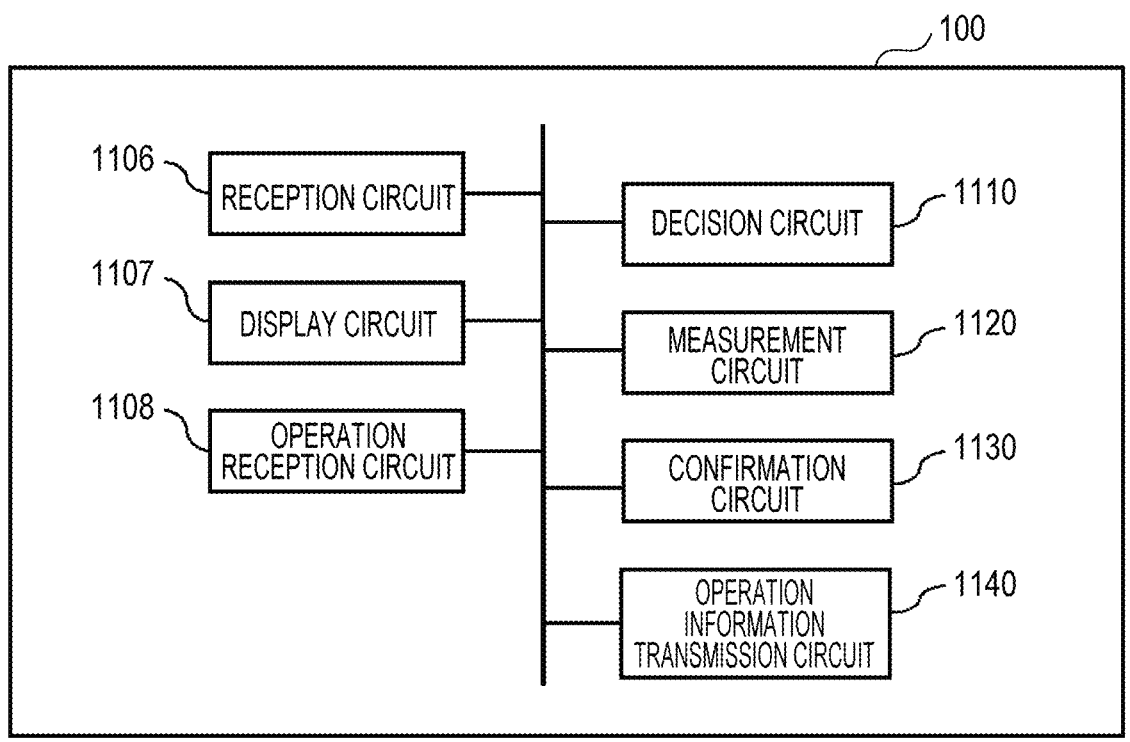
FIG. 20 is a circuit configuration diagram illustrating another example of the circuit configuration for executing the computer process.

The functions may be achieved by a reception circuit 1106, a display circuit 1107, an operation reception circuit 1108, a decision circuit 1110, a measurement circuit 1120, a confirmation circuit 1130, and an operation information transmission circuit 1140 illustrated in FIG. 20. The reception circuit 1106, the display circuit 1107, the operation reception circuit 1108, the decision circuit 1110, the measurement circuit 1120, the confirmation circuit 1130, and the operation information transmission circuit 1140 are achieved by the reception unit 106, the display unit 107, the operation reception unit 108, the decision unit 110, the measurement unit 120, the confirmation unit 130, and the operation information transmission unit 140, respectively. Details of these components are as described above.

With this configuration, technical improvements for solving or mitigating at least part of the problems of the example of the related art can be provided. More specifically, an information processing system capable of improving a streamer's willingness to stream and/or viewers' willingness to view can be provided.

An information processing apparatus such as a computer or a mobile telephone may be appropriately used to function as the server apparatus or the terminal apparatus according to the above-described embodiment. The information processing apparatus may be achieved by storing a program in which processing for achieving the functions of the server apparatus or the terminal apparatus according to the embodiment is described in a storage unit thereof and reading and executing the program using a CPU thereof.

Although some embodiments of the present disclosure have been described, these embodiments are examples and not intended to limit the scope of the present disclosure. These novel embodiments may be implemented in various other modes and subjected to various ways of omission, replacement, and modification without deviating from the scope of the present disclosure. These embodiments and modifications thereof are included in the scope and spirit of the present disclosure and also included in the disclosure described in the claims and its equivalent scope.

Each of the methods described in the embodiments may be stored, as a program executable by a computer, in a storage medium such as a magnetic disk (a floppy disk, a hard disk, etc.), an optical disc (compact disc read-only memory (CD-ROM), a digital versatile disc (DVD), a magneto-optical (MO) disk, etc.), or a semiconductor memory (a ROM, a RAM, a flash memory, etc.) and distributed, or distributed through a communication medium. The program stored in the storage medium may be a setting program for building, in the computer, software means (not only the program to be executed but also tables and data structures) to be executed by the computer. The computer for achieving the information processing apparatus performs the above-described processes by reading the program stored in the storage medium or building the software means using the setting program and controlling operations using the software means. The storage medium herein is not limited to one for distribution purposes but may be a magnetic disk, a semiconductor memory, or the like provided inside the computer or for a device connected to the computer over a network. The storage unit may function as, for example, a main storage device, an auxiliary storage device, or a cache memory.

The above-described "gifts" and "emotes" and other items to be communicated by the information processing system in the present disclosure are all electronic "data".

A communication network for achieving the above-described network may be, but is not limited to, a mobile telephone network, a wireless network (e.g., Bluetooth, Wi-(as specified in IEEE 802.11a/b/n etc.), WiMAX, or radio-frequency (RF) communication via a cellular network, a satellite, laser light, or infrared light), a landline network, the Internet, an intranet, a local area network (LAN), a wide area network (WAN), and/or an Ethernet network.

The above-described memory may be, but is not limited to, a computer-readable storage medium such as a volatile memory (e.g., a register, a cache, or a RAM), a nonvolatile memory (e.g., a ROM, an electrically erasable programmable read-only memory (EEPROM), or a flash memory), or a storage (e.g., a hard disk drive (HDD), an SSD, a magnetic tape, or an optical medium). As easily understood, the term "computer-readable storage medium" may include a medium for storing data, such as a memory and a storage, not transmission media such as modulated data signals, that is, temporary signals.

The present specification is described by means of various representative embodiments, which are not intended to be limited in any way. Words implying a singular form, such as "a", "one", "this", and "that", also imply a plural form herein unless it is clearly stated that an item in question is not plural. A term "include" can also imply "provided with" or "equipped with". Furthermore, terms "coupled", "coupling", "linked", "linking", "connected", and "connecting" include mechanical, electrical, magnetic, optical, and other methods for coupling, linking, or connecting targets to each other and do not exclude presence of an intermediate element between targets coupled, linked, or connected to each other.

The various systems, methods, and apparatuses described herein should not be interpreted as being limited in any way. The present disclosure actually encompasses all novel characteristics and modes among the various embodiments disclosed herein, combinations of some of the various embodiments, and combinations of parts of some of the various embodiments. The various systems, methods, and apparatuses described herein are not limited to certain modes, certain characteristics, or combinations of a certain mode and a certain characteristic. The objects and the methods described herein do not require presence of one or more certain advantageous effects or solution of the problems. Furthermore, various characteristics or modes in the various embodiments described herein, or parts of the characteristics or the modes, may be combined together and used.

The operations of some of the various methods disclosed herein have been described in certain order for convenience, this kind of description should be understood as including rearrangement of the order of the operations, unless as the certain order is required by the following certain sentences. For example, the operations described in the certain order might be rearranged or simultaneously performed in some cases. Furthermore, the accompanying drawings do not illustrate, for the sake of simplification, various methods in which the various items and methods described herein can be used together with other items and methods. In addition, terms such as "generate", "cause", "display", "receive", "evaluate", and "stream" might be used herein. These terms are high-level descriptions of the various actual operations to be performed. The various actual operations corresponding to these terms can change depending on certain implementations and be easily recognized by those skilled in the art who gain benefit of the disclosure of the present specification.

Operation theories, scientific principles, and other theoretical descriptions presented herein in relation to the apparatus or the method in the present disclosure are provided for better understanding, and not intended to limit the technical scope. The apparatus and the method in the accompanying claims are not limited to apparatuses and methods based on methods specified by the operation theories.

Every one of the various methods disclosed herein can be implemented using a plurality of commands executable by a computer, the commands being stored in one or more computer-readable media (e.g., non-transitory computer-readable storage media such as one or more optical discs, a plurality of volatile memory parts, or a plurality of nonvolatile memory parts), and executed by the computer. Here, the plurality of nonvolatile memory parts include, for example, a dynamic random-access memory (DRAM) or a static random-access memory (SRAM). The plurality of nonvolatile memory parts include, for example, a hard drive and an SSD. Furthermore, the computer may be, for example, any commercially available computer including computing hardware, such as a smartphone or another mobile device.

Every one of a plurality of commands executable by the computer for implementing the techniques disclosed herein can be stored in one or more computer-readable media (e.g., non-transitory computer-readable storage media) along with any data generated and used between implementations of the various embodiments disclosed herein. The plurality of commands executable by the computer can be, for example, a part of an individual software application or a part of a software application accessed or downloaded via a web browser or another software application (e.g., a remote computing application). Such software can be executed, for example, by a single local computer (e.g., as an agent executed by any suitable commercially available computer) or in a network environment (e.g., the Internet, a WAN, a LAN, a client server network (such as a cloud computing network), or another network of this kind) using one or more network computers.

For the sake of clarification, only certain selected modes have been described among various implementations based on software. Other detailed items known in the field have been omitted. The techniques disclosed herein, for example, are not limited to a certain computer language or a certain program. For example, the techniques disclosed herein can be executed by software written in C, C++, Java, or any other suitable programming language. Similarly, the techniques disclosed herein are not limited to a certain computer or a certain type of hardware. Certain detailed items of a suitable computer and hardware are known and need not be described in detail herein.

Furthermore, every one of various embodiments based on such software (e.g., includes a plurality of commands, executable by a computer, for causing the computer to execute one of the various methods disclosed herein) can be uploaded, downloaded, or remotely accessed using suitable communication means. The suitable communication means may be, for example, the Internet, the World Wide Web, an intranet, a software application, cable (may be optical fiber cable), magnetic communication, electromagnetic communication (may be RF communication, microwave communication, or infrared communication), electronic communication, or another communication means of this kind.

What is claimed is:

1. An information processing system, comprising:
processing circuitry configured to
generate first information for displaying a video on an information processing apparatus;
transmit the first information to the information processing apparatus;
receive operation information regarding a plurality of operations performed on a first icon to take an action on the video displayed on the information processing apparatus; and
determine, based on the operation information, a display mode of an object corresponding to the first icon, wherein
the processing circuitry generates the first information for displaying the object on the video in the display mode,
the plurality of operations are one of a tap, a tap and press, and a long press of the first icon,
the display mode of the first object changes stepwise as a number of times of the plurality of operations increases, and
a size of the first object increases with an increasing number of the plurality of operations.

2. The information processing system according to claim 1, wherein the processing circuitry determines the display mode by setting an amount of change from a reference value of at least one parameter of plural parameters set for the object based on the operation information, the plural parameters including display size, transparency, moving speed and motion.

3. The information processing system according to claim 2, wherein the processing circuitry determines the display mode of the object based on a parameter as well as the operation information.

4. The information processing system according to claim 3, wherein the parameter relates to any of a number of concurrent users of the video, a sales condition of the video, or a progress state of the video.

5. The information processing system according to claim 3, wherein the parameter relates to a value of the first icon or an average operation interval of the plurality of operations performed on the first icon.

6. The information processing system according to claim 1, wherein the processing circuitry is further configured to
determine, for the plurality of operations, whether a second operation has been performed within a period of time from a first operation,
measure a number of operations in a case that the processing circuitry determines that the second operation has been performed within the period of time from the first operation, and
end measurement of the number of operations in a case that the processing circuitry determines that the second operation has not been performed within the period of time from the first operation,
confirm the number of operations in a case where measurement is ended, and
transmit the number confirmed by the processing circuitry as the operation information.

7. The information processing system according to claim 6, wherein the processing circuitry is further configured to change, in a case that the second operation is determined to have been performed within the period of time from the first operation, the display mode of the first icon.

8. The information processing system according to claim 6, wherein the processing circuitry is further configured to control playback, in a case that the second operation is determined to have been performed within the period of time from the first operation, of a sound effect based on the number of operations.

9. The information processing system according to claim 6, wherein the processing circuitry transmits the number as the operation information in a case where the number is confirmed.

10. The information processing system according to claim 6, wherein the processing circuitry transmits the number as the operation information in accordance with an instruction from the information processing apparatus after the number is confirmed.

11. The information processing system according to claim 10, wherein the processing circuitry is further configured to control a display of the information processing apparatus to display a second icon for receiving the instruction.

12. The information processing system according to claim 11, wherein the processing circuitry is further configured to
control storage of history information regarding the number,
control the information processing apparatus to display a third icon generated based on the history information, and
in a case that an operation is performed on the third icon, transmit the operation information while assuming that a plurality of operations have been performed on the first icon.

13. The information processing system according to claim 6, wherein the processing circuitry is further configured to transmit, in a case that the number of operations measured by the processing circuitry reaches a first value, the first value as intermediate operation information before the processing circuitry confirms the number.

14. The information processing system according to claim 13, wherein the processing circuitry is further configured to
determine whether a cancelation operation has been performed within a period of time from the operation,
in a case that the cancelation operation is determined to have been performed after the number of operations measured by the processing circuitry reaches the first value, cancel an operation performed after the first value is reached, and
in a case that the cancelation operation is determined to have been performed before the number of operation measured by the processing circuitry reaches the first value, cancel all of the plurality of operations.

15. The information processing system according to claim 13, wherein the processing circuitry is further configured to
receive the intermediate operation information,
generate, based on the intermediate operation information, second information for displaying a first icon displayed on another information processing apparatus in a different display mode, and transmit the second information to the another information processing apparatus.

16. The information processing system according to claim 6, wherein the processing circuitry is further configured to, in a case that the second operation has not been performed within the period of time from the first operation,
control the information processing apparatus to display an inquiry screen on the one of the one or more first information processing apparatuses,
inquire whether to continue before the processing circuitry ends the measurement of the number of operations,
in a case that the inquiry indicates to continue, continue to measure the number of operations, and
in a case that the inquire indicates not to continue, end the measurement of the number of operations.

17. The information processing system according to claim 1, wherein the processing circuitry does not receive information regarding each of the plurality of operations but receives operation information regarding all of the plurality of operations.

18. An information processing method, comprising:
generating, by processing circuitry of an information processing system, first information for displaying a video on an information processing apparatus;
transmitting the first information to the information processing apparatus;
receiving operation information regarding a plurality of operations performed on a first icon to take an action on the video displayed on the information processing apparatus; and
determining, based on the operation information, a display mode of an object corresponding to the first icon, wherein
the first information is generated for displaying the object on the video in the display mode,
the plurality of operations are one of a tap, a tap and press, and a long press of the first icon
the display mode of the first object changes stepwise as a number of times of the plurality of operations increases, and
a size of the first object increases with an increasing number of the plurality of operations.

* * * * *